(12) United States Patent
Tate et al.

(10) Patent No.: US 9,773,189 B2
(45) Date of Patent: Sep. 26, 2017

(54) RECOGNITION APPARATUS AND RECOGNITION METHOD

(71) Applicant: CANON KABUSHIKI KAISHA, Tokyo (JP)

(72) Inventors: Shunta Tate, Tokyo (JP); Katsuhiko Mori, Kawasaki (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 14/685,427

(22) Filed: Apr. 13, 2015

(65) Prior Publication Data
US 2015/0294193 A1 Oct. 15, 2015

(30) Foreign Application Priority Data

Apr. 15, 2014 (JP) ................................ 2014-083781

(51) Int. Cl.
*G06K 9/62* (2006.01)
*G06K 9/46* (2006.01)
(Continued)

(52) U.S. Cl.
CPC ....... *G06K 9/4642* (2013.01); *G01C 21/3691* (2013.01); *G06K 9/00785* (2013.01);
(Continued)

(58) Field of Classification Search
CPC ............. G06K 9/00785; G06K 9/4642; G06K 9/6202; G06K 9/6215; G06K 9/6276;
(Continued)

(56) References Cited

U.S. PATENT DOCUMENTS

2005/0129316 A1* 6/2005 Curti ................... G06F 17/3025
382/224
2007/0003138 A1* 1/2007 Hobson ................... G06T 7/194
382/173
(Continued)

FOREIGN PATENT DOCUMENTS

JP 2013-114596 A 6/2013

OTHER PUBLICATIONS

Li-Jia Li, Hao Su, Yongwhan Lim, Li Fei-Fei, "Objects as Attributes for Scene Classification", Proc. of the European Conf. on Computer Vision (ECCV 2010).
(Continued)

*Primary Examiner* — Samir Ahmed
(74) *Attorney, Agent, or Firm* — Canon USA, Inc. I.P. Division

(57) ABSTRACT

A recognition apparatus according to an embodiment of the present invention includes: a candidate region extraction unit configured to extract a subject candidate region from an image; a feature value extraction unit configured to extract a feature value related to an attribute of the image from the subject candidate region extracted by the candidate region extraction unit; an attribute determination unit configured to determine an attribute of the subject candidate region extracted by the candidate region extraction unit on the basis of the feature value extracted by the feature value extraction unit; and a determination result integration unit configured to identify an attribute of the image by integrating determination results of the attribute determination unit.

17 Claims, 19 Drawing Sheets

(51) Int. Cl.
*G06K 9/00* (2006.01)
*G01C 21/36* (2006.01)
*G08G 1/01* (2006.01)
*G08G 1/0962* (2006.01)
*B60C 9/00* (2006.01)

(52) U.S. Cl.
CPC ......... *G06K 9/6202* (2013.01); *G06K 9/6215* (2013.01); *G06K 9/6262* (2013.01); *G06K 9/6276* (2013.01); *G08G 1/0112* (2013.01); *G08G 1/0129* (2013.01); *G08G 1/0141* (2013.01); *G08G 1/09626* (2013.01); *B60C 9/00* (2013.01)

(58) Field of Classification Search
CPC ...... G06K 9/6262; B60Q 9/00; G08G 1/0145; G08G 1/0133; G08G 1/0112; G01C 21/3691
See application file for complete search history.

(56) References Cited

U.S. PATENT DOCUMENTS

| | | | | |
|---|---|---|---|---|
| 2007/0005356 A1* | 1/2007 | Perronnin | ............ | G06K 9/4676 704/245 |
| 2007/0242856 A1* | 10/2007 | Suzuki | ............... | G06K 9/00275 382/103 |
| 2007/0258648 A1* | 11/2007 | Perronnin | .......... | G06K 9/00281 382/224 |
| 2008/0069456 A1* | 3/2008 | Perronnin | ............ | G06K 9/4671 382/228 |
| 2009/0316988 A1* | 12/2009 | Xu | ....................... | G06K 9/6256 382/173 |
| 2010/0014755 A1* | 1/2010 | Wilson | ............... | G06K 9/00604 382/173 |
| 2010/0040285 A1* | 2/2010 | Csurka | ............... | G06K 9/00624 382/170 |
| 2010/0189354 A1* | 7/2010 | de Campos | ........ | G06K 9/00597 382/190 |
| 2011/0158535 A1* | 6/2011 | Iio | ........................ | G06K 9/4642 382/190 |
| 2012/0002107 A1* | 1/2012 | Damkat | ................ | G06T 3/0012 348/445 |

OTHER PUBLICATIONS

P. Felzenszwalb, R. Girshick, D.McAllester, and D. Ramanan. "Object Detection with Discriminatively Trained Part Based Models", IEEE Trans. on Pattern Analysis and Machine Intelligence 2010.

Koen E. A. van de Sande, Jasper R. R. Uijlings, Theo Gevers, Arnold W. M. Smeulders, "Segmentation As Selective Search for Object Recognition," IEEE International Conference on Computer Vision, 2011.

Jianbo Shi and Jitendra Malik, "Normalized Cuts and Image Segmentation," IEEE Trans. on Pattern Analysis and Machine Intelligence, vol. 22, No. 8, Aug. 2000.

Joao Carreira and Cristian Sminchisescu, "Constrained Parametric Min-Cuts for Automatic Object Segmentation," IEEE Conference on Computer Vision and Pattern Recognition, 2010.

Svetlana Lazebnik, Cordelia Schmid, Jean Ponce, "Beyond Bags of Features: Spatial Pyramid Matching for Recognizing Natural Scene Categories," IEEE Conference on Computer Vision and Pattern Recognition, 2006.

P. Felzenszwalb, D. McAllester, D. Ramanan, "A Discriminatively Trained, Multiscale, Deformable Part Model," IEEE Conference on Computer Vision and Pattern Recognition, 2008.

T.Kobayashi and N.Otsu, "Action and Simultaneous Multiple-Person Identification Using Cubic Higher-Order Local Auto-Correlation", In Proc. International Conference on Pattern Recognition, pp. 741-744, 2004.

* cited by examiner

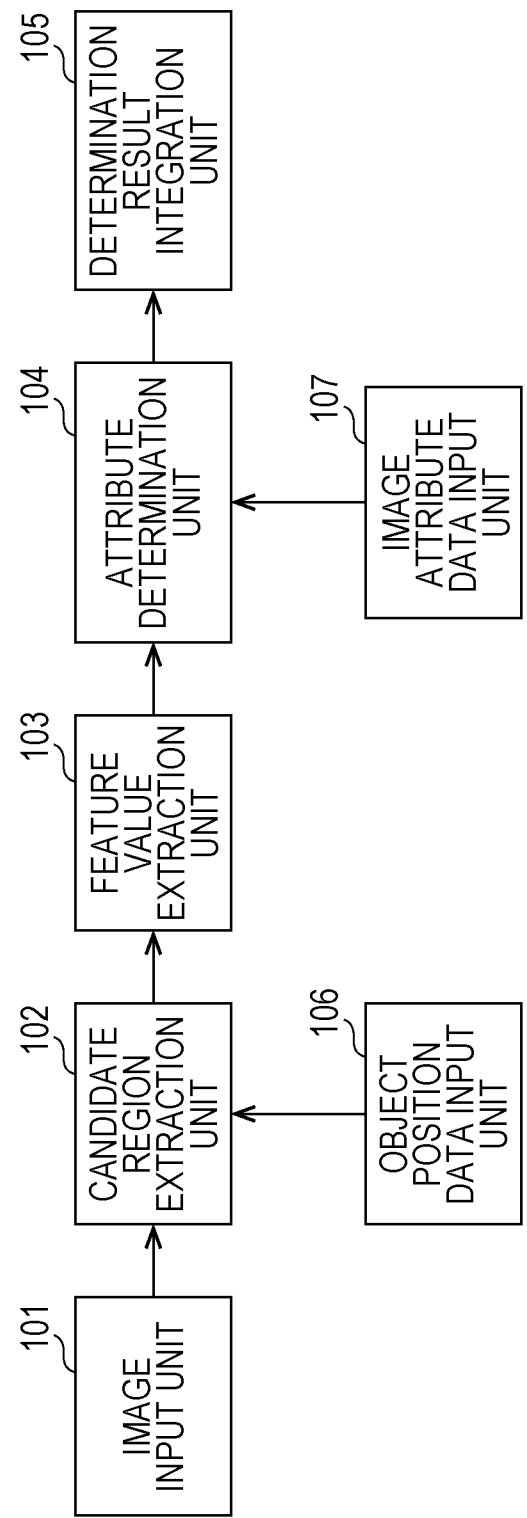

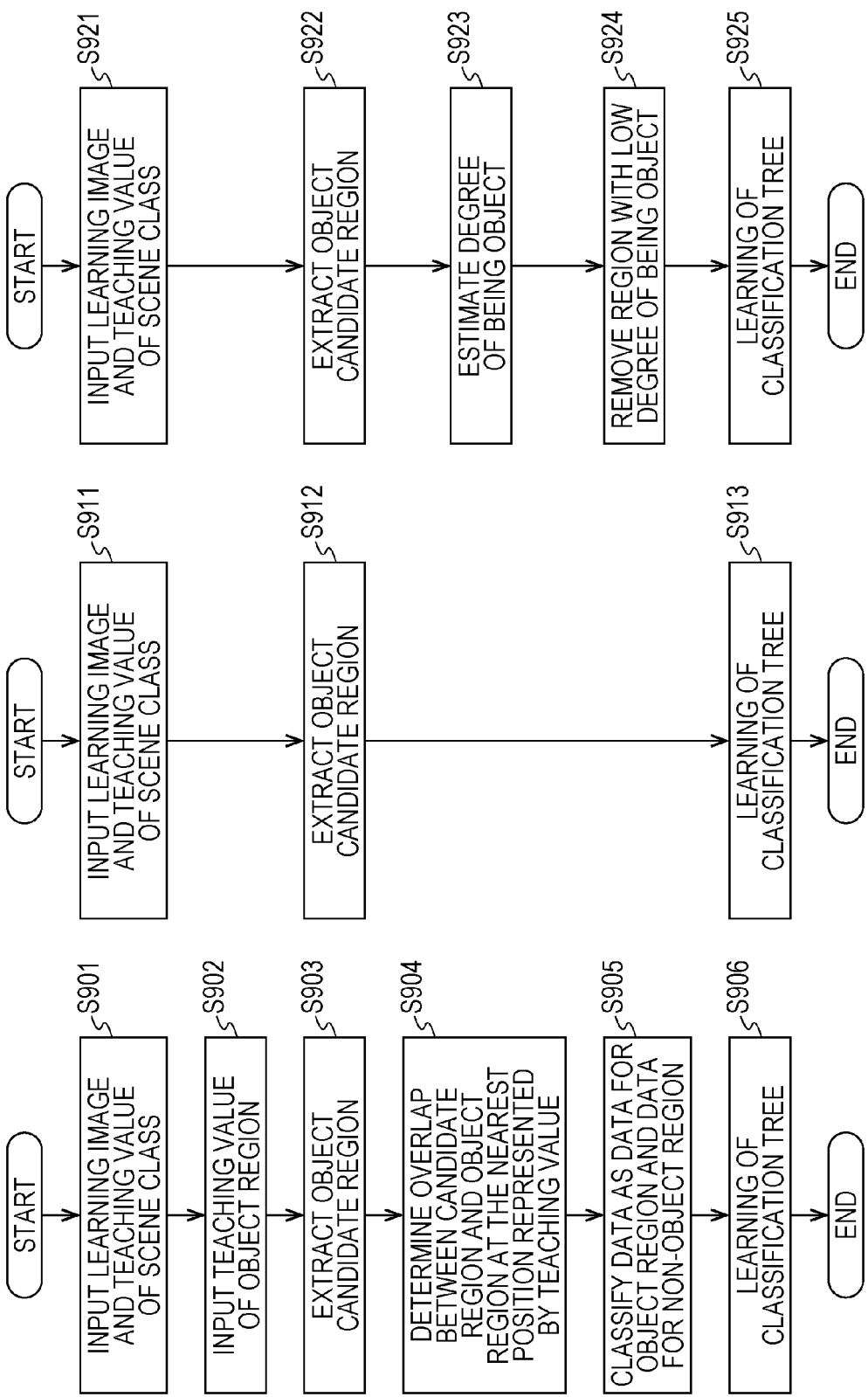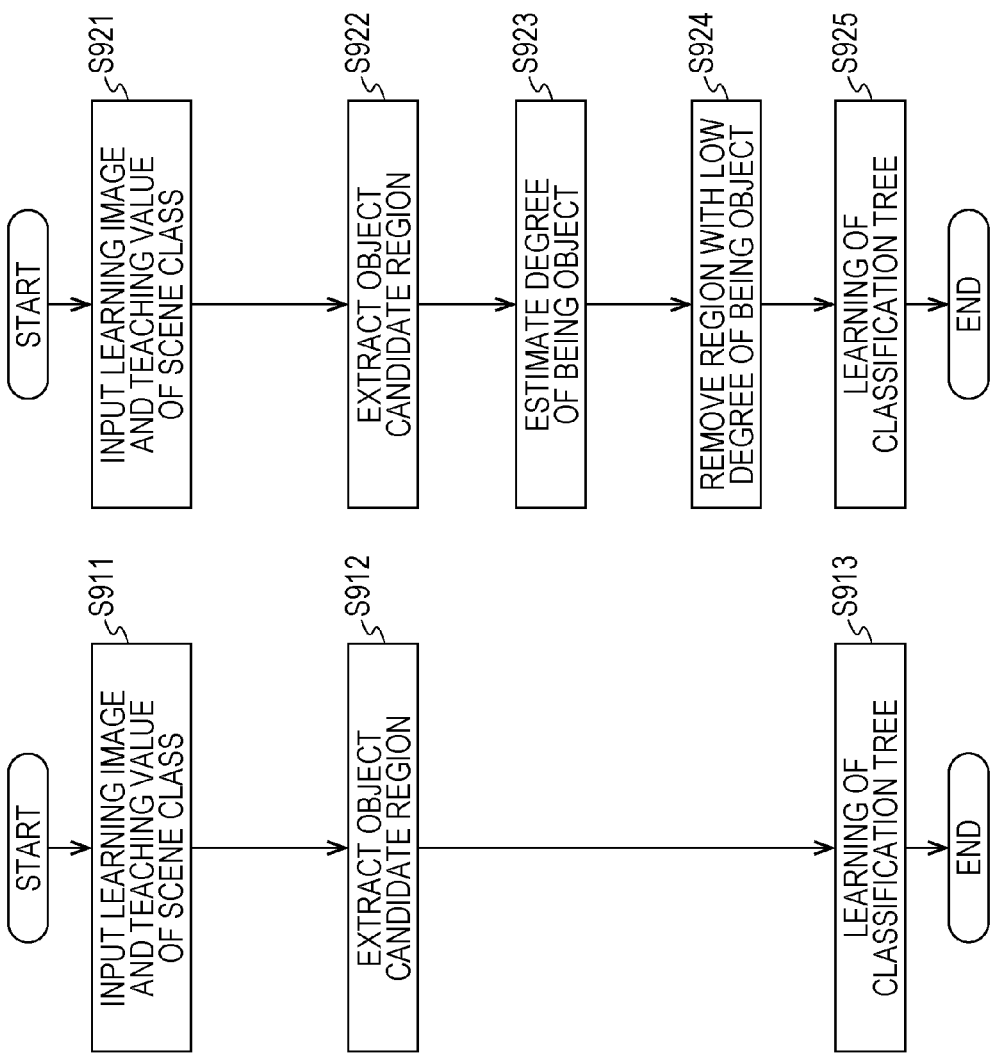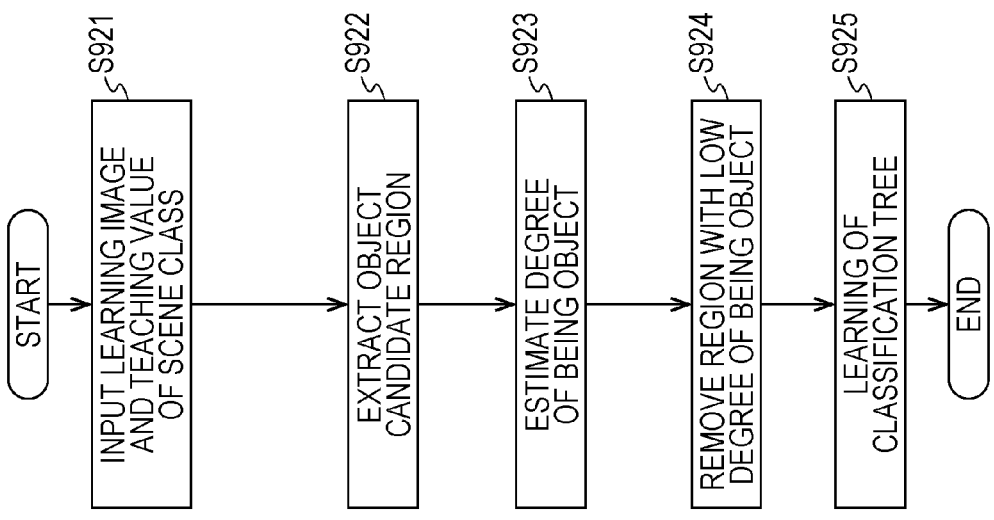

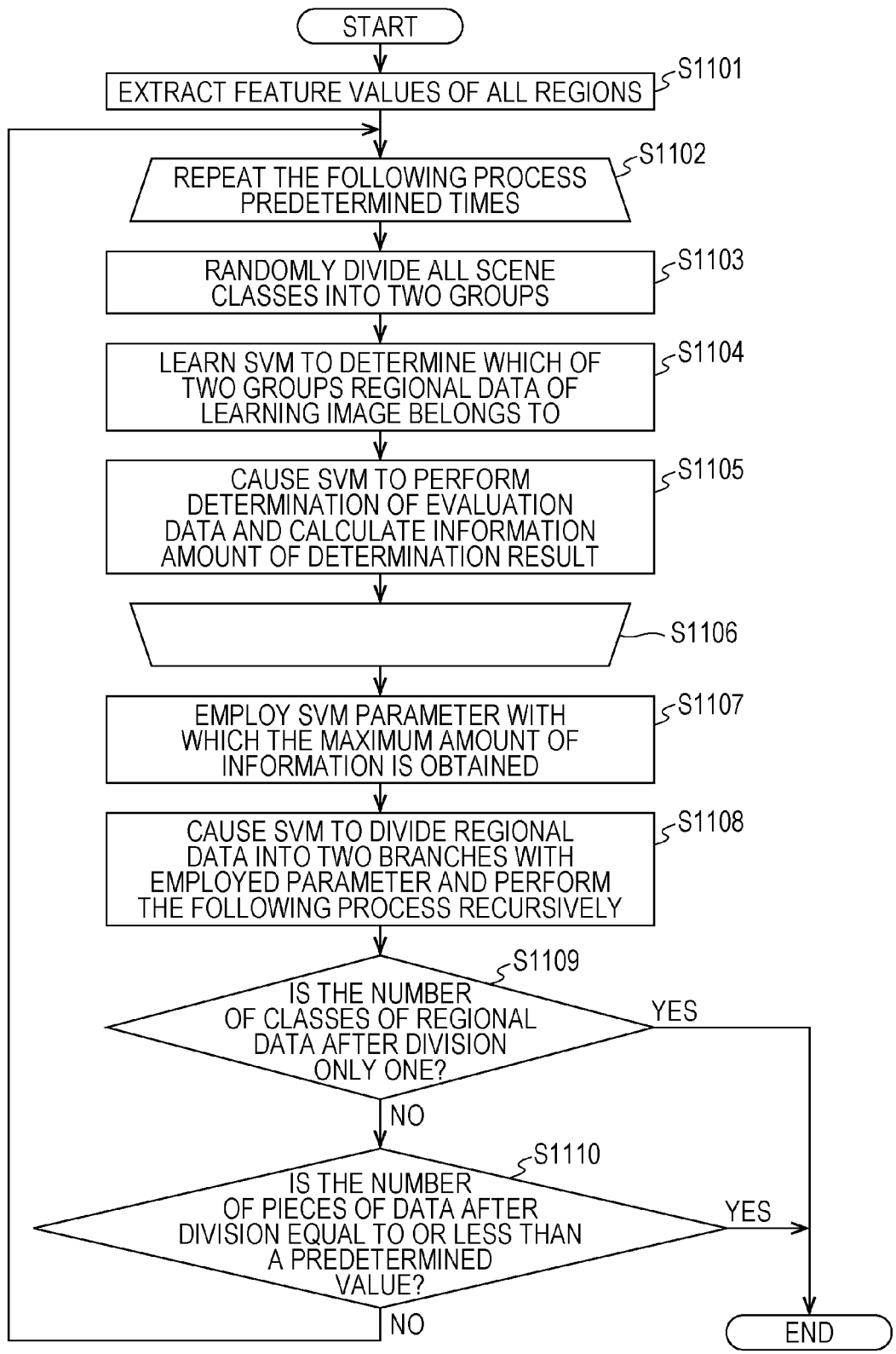

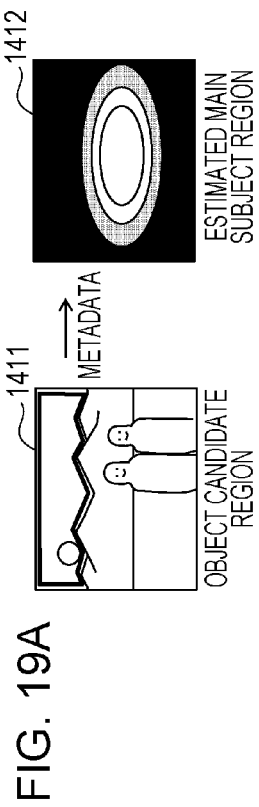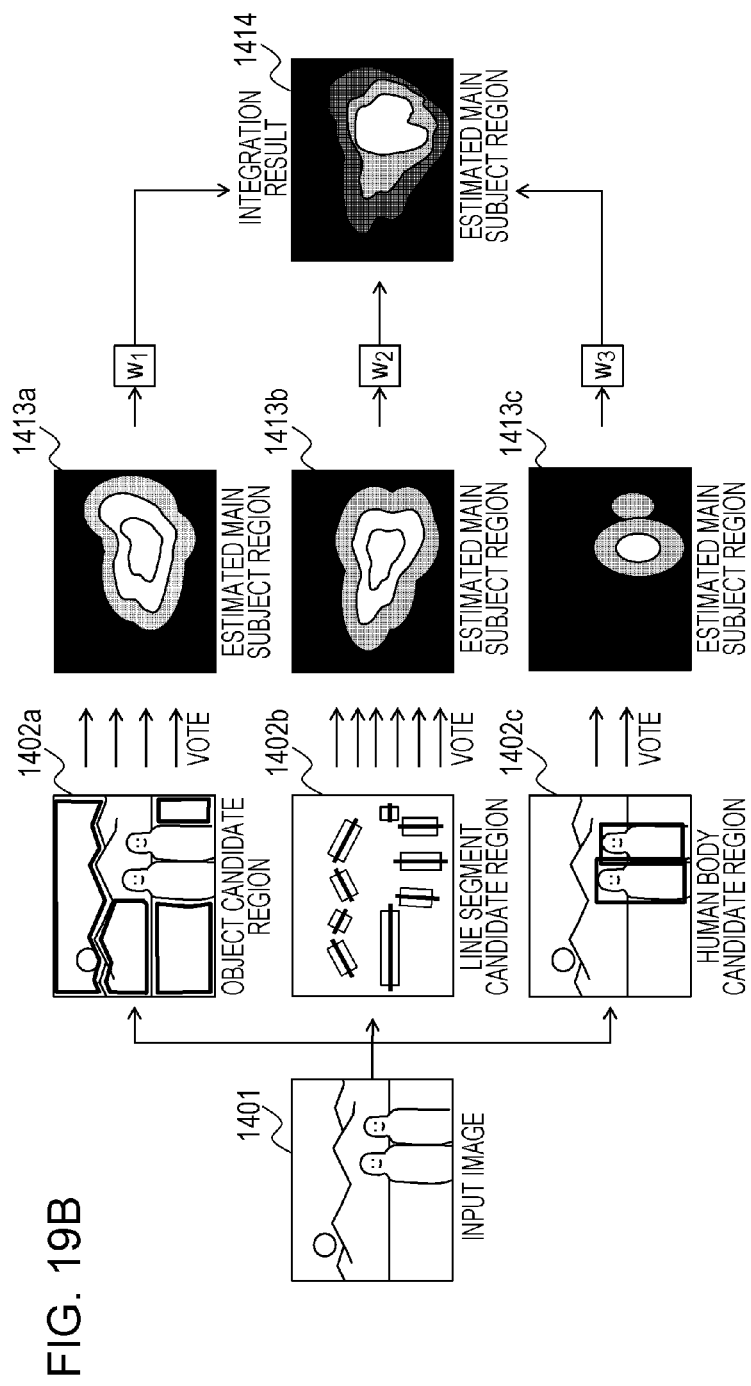

RECOGNITION APPARATUS AND RECOGNITION METHOD

BACKGROUND OF THE INVENTION

Field of the Invention

The present invention relates to a recognition apparatus and a recognition method, and, more particularly, to a technique suitable for use in estimating attribute information (for example, a scene, an event, composition, or a main subject) of an input image such as a still image, a moving image, or a distance image on the basis of an object in the input image.

Description of the Related Art

Examples of a known method of estimating the scene or event of an image on the basis of an object in the image include Li-Jia Li, Hao Su, Yongwhan Lim, Li Fei-Fei, "Objects as Attributes for Scene Classification", Proc. of the European Conf. on Computer Vision (ECCV 2010) (Non-Patent Document 1). Referring to Non-Patent Document 1, it is determined whether an image includes objects of a plurality of particular classes, the distribution of results of the determination is used as a feature value, and the scene of the image is determined on the basis of the feature value.

In this exemplary method, it is necessary to prepare a plurality of detectors for recognizing a subject serving as a clue to scene determination (for example, detectors using the method disclosed in P. Felzenszwalb, R. Girshick, D. McAllester, and D. Ramanan. "Object Detection with Discriminatively Trained Part Based Models", IEEE Trans. on Pattern Analysis and Machine Intelligence 2010) (Non-Patent Document 2) and perform detection processing for each particular subject such as a dog or a car. At that time, the following difficulties arise.

First, in order to accurately determine the types of many scenes, it is necessary to prepare detectors for many subjects associated with each of these scenes. In the detection processing disclosed in Non-Patent Document 2, since each detector performs image scanning called sliding window, the amount of computation becomes large. A processing time taken for scene determination may markedly increase with the increase in the number of scenes.

Second, in the scene determination, it is not generally known which of subjects is important. Therefore, it is difficult to determine in advance which type of subject detector is prepared when discriminating between slightly different scenes.

And third, for example, when discriminating between the scene of a birthday party and the scene of a wedding, the difference between clothes a person wears (for example, the difference between informal clothes and a dress) can be used for the discrimination. Thus, in some cases, the presence or absence of a subject is not important and the difference between variations of a subject is important. However, in the case of the method in the related art disclosed in Non-Patent Document 1, it is difficult to use the difference between variations of a subject for discrimination.

The present invention provides a recognition apparatus capable of determining the scene of an image on the basis of various subjects included in the image with a low processing load.

SUMMARY OF THE INVENTION

A recognition apparatus according to an embodiment of the present invention includes: a candidate region extraction unit configured to extract a subject candidate region from an image; a feature value extraction unit configured to extract a feature value related to an attribute of the image from the subject candidate region extracted by the candidate region extraction unit; an attribute determination unit configured to determine an attribute of the subject candidate region extracted by the candidate region extraction unit on the basis of the feature value extracted by the feature value extraction unit; and a determination result integration unit configured to identify an attribute of the image by integrating determination results of the attribute determination unit.

Further features of the present invention will become apparent from the following description of exemplary embodiments with reference to the attached drawings.

BRIEF DESCRIPTION OF THE DRAWINGS

FIG. 8 is a block diagram illustrating the basic configuration of a learning phase according to the first embodiment.

FIGS. 9A to 9C are flowcharts describing processes in the learning phase according to the first embodiment.

FIG. 11 is a flowchart describing a classification tree learning process in the learning phase.

FIGS. 19A and 19B are diagrams illustrating exemplary results of estimation of a main subject region.

DESCRIPTION OF THE EMBODIMENTS

First Embodiment

A recognition apparatus according to an embodiment of the present invention will be described below with reference to the accompanying drawings. This recognition apparatus receives an input image and accurately determines which of a plurality of scene classes set in advance the input image belongs to.

Figure 1:
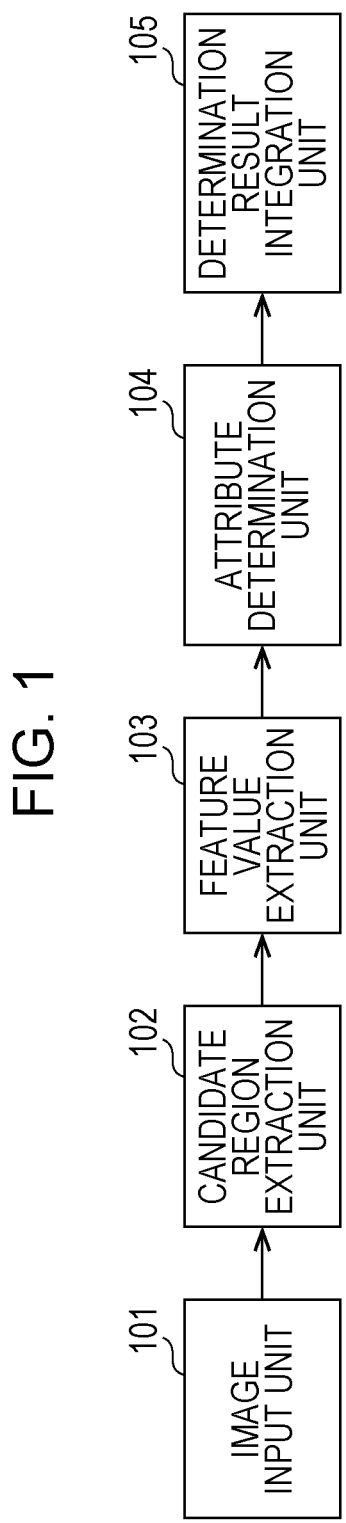
FIG. 1 is a block diagram illustrating the basic configuration of a recognition apparatus according to a first embodiment.

FIG. 1 illustrates the basic configuration of a recognition apparatus according to the first embodiment. An image input unit 101 receives image data. A candidate region extraction unit 102 extracts the region of a subject related to the attribute of an image so as to determine the attribute information of the image. A feature value extraction unit 103 extracts an image feature value from a subject candidate region extracted by the candidate region extraction unit 102. An attribute determination unit 104 determines which of images of scene classes includes the subject candidate region on the basis of the feature value extracted by the feature value extraction unit 103. A determination result integration unit 105 integrates results of determination performed by the attribute determination unit 104 and determines the scene class of the image.

Examples of an image scene class include various types of scenes and events such as a birthday party, a Christmas party, a wedding, a camp, a field day, and a school play. In this embodiment, the above-described several tens of scene classes are provided in advance by a user and it is determined which of these scene classes an input image belongs to.

The present invention can be applied to scene classes other than the above-described scene classes related to daily things. For example, image capturing modes such as a night view mode, a light source direction (direct light, backlight, oblique light from the right, or oblique light from the left), and a flower close-up mode, which are set in a camera for the sake of adjustment of image capturing parameters, may be defined as scene classes. Thus, the present invention can be applied to the determination of attributes of various target images.

Next, a recognition process and a learning process which are performed by a recognition apparatus according to this embodiment will be described.

<Recognition Phase>

First, a recognition process will be described with reference to a flowchart illustrated in FIG. 2.

In step S201, the image input unit 101 receives image data. Here, image data according to an embodiment of the present invention is video information of each of various types of images such as a color image, a moving image, and a distance image or the combination of these pieces of video information. In this embodiment, the image input unit 101 receives a color still image. In this step, preprocessing such as image size scaling or brightness value normalization required for the following recognition process is performed as appropriate.

In step S202, the candidate region extraction unit 102 extracts a plurality of subject candidate regions serving as clues to the determination of a scene class of the image. In an image, there is the region of an object such as a person, a dog, or a cup having a definite shape and a definite size to some extent and a region of a background such as the sky, the grass, or a mountain having a relatively large size and an indefinite shape.

In this embodiment, a method of determining an image scene by analyzing an object will be described. More specifically, for example, when there is the region of an object such as a dish in an image, the scene of the image is probably party. When there is an object shaped like a lamp in an image, the scene of the image is probably camp.

It is desirable that the candidate region extraction unit 102 accurately extract the whole region of an object in an image. When the extracted region includes only part of the object or also includes another object, the scene of the image may be erroneously determined.

However, it is very difficult to accurately extract each of various objects from an image without knowing what these objects are. The extraction of an object region is therefore not expected to be accurately performed here. A plurality of candidate regions considered to be object regions are extracted. Under the assumption that some of these candidate regions are object regions with certainty, the determination of an image scene is performed upon each of the candidate regions. By a majority vote of results of the determination, the determination of a scene class is expected to be accurately performed in spite of the fact that the results may include errors.

There are various methods in the related art that can be used for the extraction of a candidate region under the above-described conditions. In this embodiment, the technique in the related art disclosed in Koen E. A. van de Sande, Jasper R. R. Uijlings, Theo Gevers, Arnold W. M. Smeulders, Segmentation As Selective Search for Object Recognition, IEEE International Conference on Computer Vision, 2011 (Non-Patent Document 3) is used. The brief description of a process will be made with reference to a flowchart in FIG. 3.

In step S301, an image is divided into small regions called Super-pixels (hereinafter referred to as SPs) each including pixels having similar colors.

Next, in step S302, (1) the similarity level of a texture feature and (2) the similarity level of a size are calculated for all pairs of adjacent SPs. The weighted sum of these similarity levels is calculated using a predetermined coefficient $\alpha$ ($0 \le \alpha \le 1$) as represented by equation 1 and is set as the similarity level of the SP pair.

$$\text{The similarity level of an SP pair} = \alpha \times \text{the similarity level of a texture feature} + (1-\alpha) \times \text{the similarity level of a size} \quad \text{[Equation 1]}$$

As the texture feature, the frequency histogram of color SIFT features, which are widely used as feature values, is used (see Non-Patent Document 3 for details). As the similarity level of a texture feature, a histogram intersection that is widely used as a distance scale is used. As the similarity level of an SP size, a value obtained by dividing the area of a smaller one in an SP pair by the area of a larger one in the SP pair. The similarity level of a texture feature and the similarity level of an SP size are 0 when they are the lowest and are 1 when they are the highest.

In step S303, two adjacent pairs of SPs between which there is the highest similarity level is coupled and a result of the coupling is set as a subject candidate region. The coupled SPs are set as a new SP. The feature value of the new SP and the similarity level between the new SP and an adjacent SP are calculated. This process (steps S302 to S306) is repeated until all SPs undergo coupling. As a result, a plurality of candidate regions of varying sizes are extracted. The number of the extracted candidate regions is the number of SPs minus one. Since too small a subject region causes a determination error, only an SP with an area greater than a predetermined value is set as a candidate region (steps S304 to S305). See Non-Patent Document 3 for the details of the above-described candidate region generation process.

The method of extracting an object-like region is not limited to the method disclosed in Non-Patent Document 3, and various methods including, for example, the graph cut method of separating a foreground and a background and the method of dividing an image into textures obtained by texture analysis (see Jianbo Shi and Jitendra Malik, Normalized Cuts and Image Segmentation, IEEE Trans. on Pattern Analysis and Machine Intelligence, Vol. 22, No. 8, 2000) for details (Non-Patent Document 4) can be employed.

Figure 2:
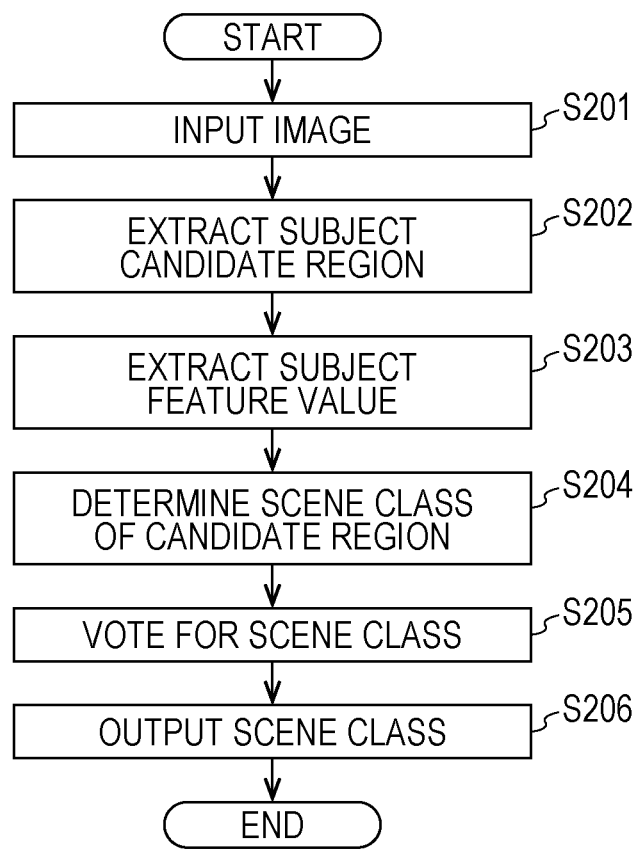
FIG. 2 is a flowchart describing a process performed by the recognition apparatus according to the first embodiment.

Referring back to the flowchart in FIG. 2.

Figure 4:
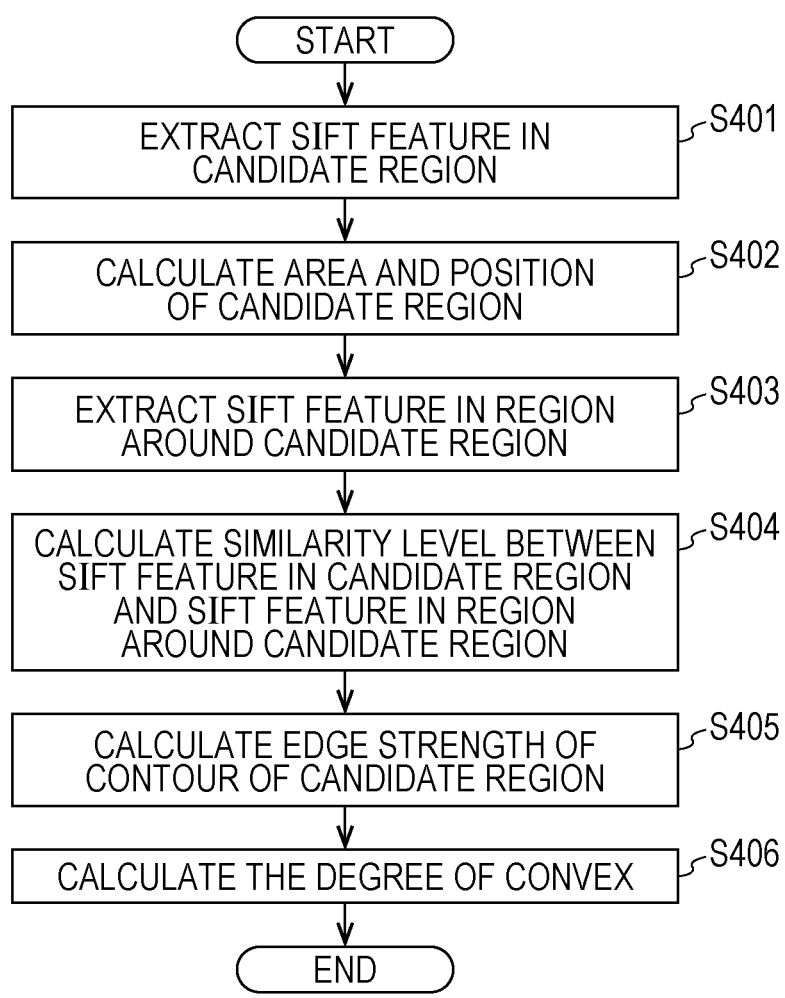
FIG. 4 is a flowchart describing a process of extracting the feature of a candidate region.

In step S203, the feature value extraction unit 103 extracts a plurality of types of feature values from each candidate region. In this embodiment, as illustrated in FIG. 4, six types of feature values are extracted.

(1) In step S401, the frequency histogram of color SIFT features in a candidate region.

(2) In step S402, the area and position of the candidate region are output. A value normalized on the assumption that the entire area of an image is 1 is used as the area of the candidate region. The position of the center of gravity in a region normalized on the assumption that the vertical and horizontal lengths of an image are 1 is used as the position of the candidate region.

(3) In step S403, color SIFT features are extracted from a region around the candidate region and a frequency histogram is generated. The reason for this is that the feature of a background serves as a clue to the recognition of an object. The region around the candidate region is a region obtained by expanding the candidate region by a predetermined width.

Next, in steps S404 to S406, as a feature value serving as a clue to the determination of whether a candidate region is an object region, the following fourth to sixth feature values are calculated.

(4) In step S404, the similarity level between the color SIFT feature in the candidate region and the frequency histogram of the color SIFT features around the candidate region is calculated as a feature value. As the similarity level, a histogram intersection is used.

(5) In step S405, the average of edge strengths of the contour of the candidate region is calculated as a feature value. The absolute values $(dx^2+dy^2)^{1/2}$ of luminance gradients of an image are calculated on the contour of a region and are averaged. Here, dx and dy represent the values of luminance gradients in the x and y directions in an image, respectively.

(6) In step S406, the degree of convex of the candidate region is calculated as a feature value. The degree of convex is the ratio between the area of the candidate region and the area of a convex hull of the candidate region. This value becomes one when the candidate region is convex and nearly zero when the candidate region is concave.

Using the above-described features, it can be determined to some degree whether the candidate region is an object region independent from the periphery.

The feature extraction process performed in step S203 has been described. In addition to the above-described feature values, various regional feature values such as the aspect ratio and moment length of a candidate region can be used. Note that feature values according to an embodiment of the present invention are not limited to the above-described feature values.

Next, in step S204, the attribute determination unit 104 determines which of scene classes each candidate region is related to on the basis of the feature of the candidate region. The important feature of the present invention is that the type of a candidate region itself is not determined and the type of a scene class to which the candidate region is related is determined.

Figure 5A:
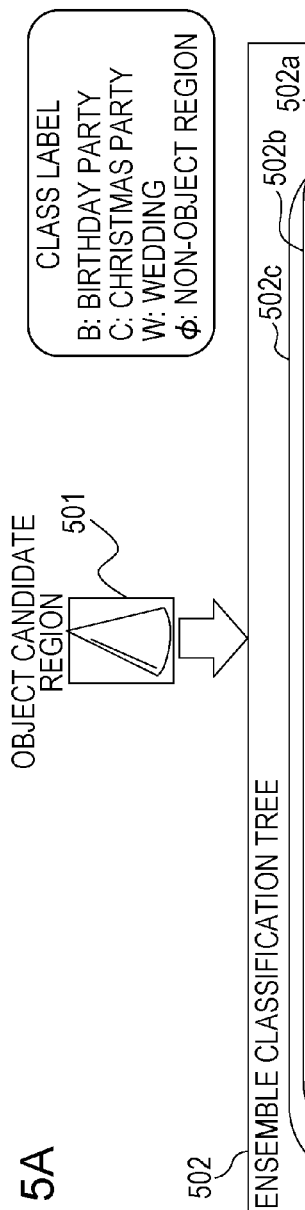
FIGS. 5A and 5B are schematic diagrams of an attribute determination unit.
Figure 5B:
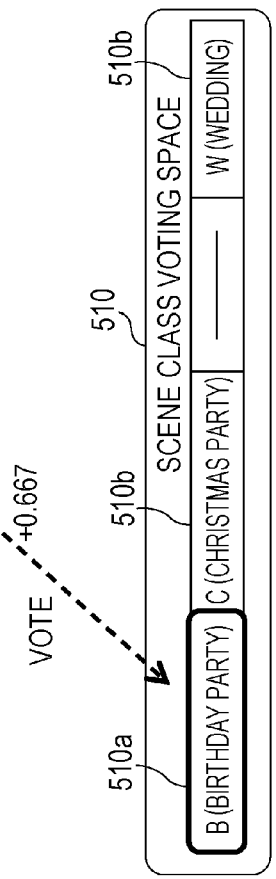

In this embodiment, as illustrated in FIG. 5A, the attribute determination unit 104 includes an ensemble classification tree 502 including the ensemble of a plurality of classification trees 502a to 502c. Each classification tree estimates a correct scene class on the basis of the feature value of a candidate region and votes a result of the estimation in a scene class voting space illustrated in FIG. 5B.

Each of discrimination nodes (partly represented by reference numerals of 503a to 503c) of a classification tree is a linear discriminator. Each of leaf nodes (partly represented by reference numerals of 503d to 503f) stores learning data assigned thereto in a learning phase. Some of pieces of learning data are represented by reference numerals of 504a to 504c, and the labels of corresponding scene classes are represented by reference numerals of 505a to 505c. As will be described in detail later in the description of a learning phase, each discrimination node is learned so that the candidate regions of pieces of learning data are classified by scene class.

Figure 6:
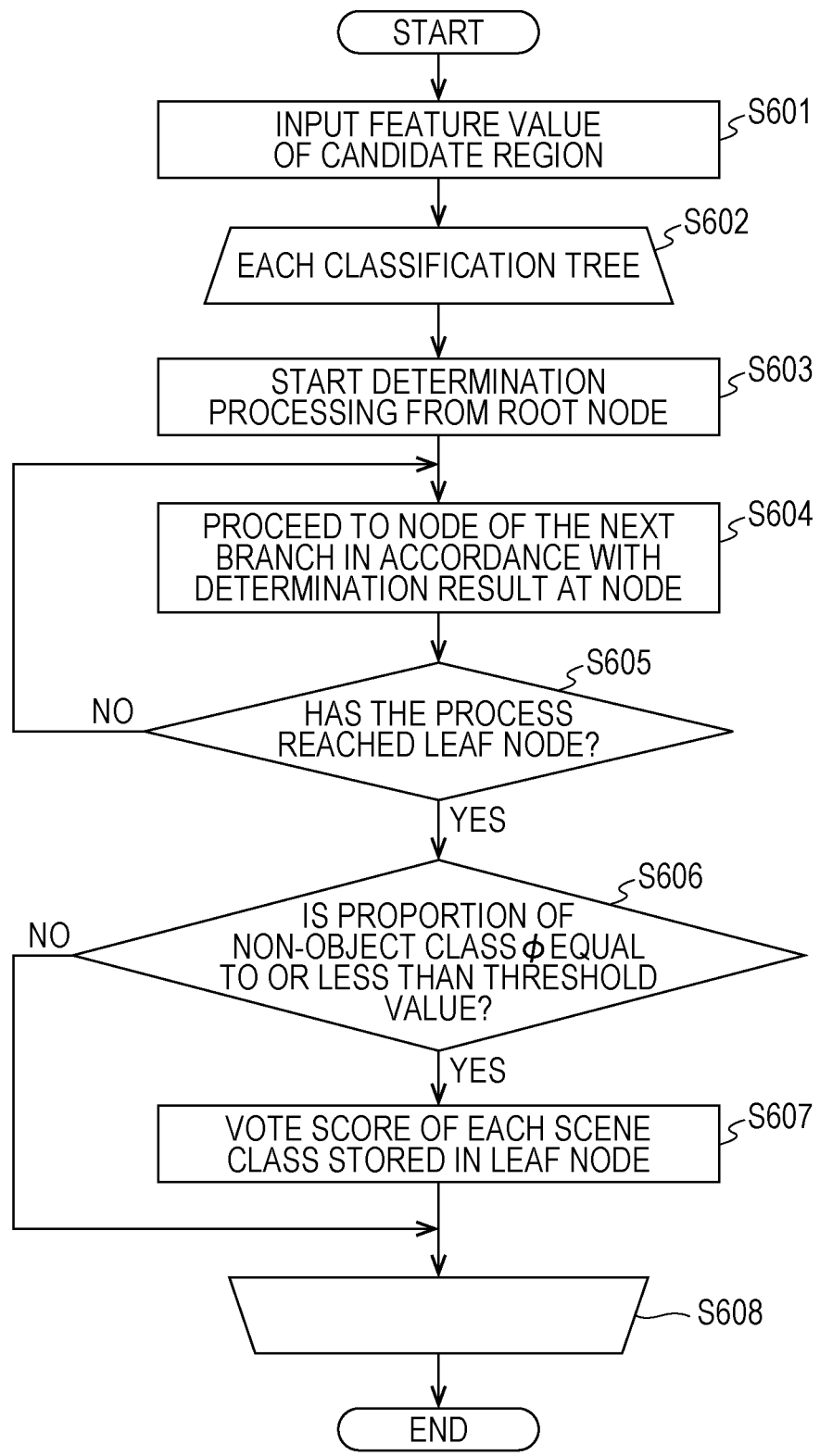
FIG. 6 is a flowchart describing an attribute determination process.

A determination process performed by an ensemble classification tree will be described with reference to a flowchart illustrated in FIG. 6.

In step S601, a candidate region is input into an ensemble classification tree. Each of the classification trees performs the determination process from steps S603 to S607.

In step S603, a scene class determination process starts from the root node 503a of a classification tree. At each node, a discriminator performs determination on the basis of the feature of the candidate region.

In step S604, the next branch is determined in accordance with a result of the determination.

In step S605, it is determined whether a leaf node has been reached. When a leaf node has not been reached, the process returns to step S604. The determination at a node and the movement from the node are repeated until a leaf node is reached. When a leaf node is reached, the proportion of the scene class of learning data stored in the leaf node is referred. The proportion becomes a scene class likelihood score of the input candidate region.

However, when a leaf node at which the proportion of learning data assigned with the sign of φ (hereinafter referred to as a non-object region class because this is data of a non-object region) is high is reached, the input candidate region is probably not an object region. Therefore, no vote is conducted at a leaf node storing data of a non-object region class whose proportion is equal to or greater than a predetermined value (step S606). Otherwise, the value of a likelihood score is voted for a corresponding class by adding the value to the value of the class (step S607). In the example illustrated in FIG. 5A, since the proportion of a birthday party class of a leaf node is ⅔, the value of 0.667 is added.

Various vote methods may be employed. For example, after one of scene classes having the highest proportion at a leaf node has been selected, only one vote may be casted for the scene class.

When each of all classification trees has finished determining all candidate regions and conducting a vote, the vote processing in step S205 ends.

Next, in step S206, a scene class having the maximum total of votes is output as the scene class of an input image. When there is no scene class having votes the number of which is equal to or greater than a predetermined threshold value, a massage saying that no scene class is found may be output. In contrast, when there are a plurality of scene classes having votes the number of which is equal to or greater than a predetermined threshold value at the same time, all of these scene classes may be output.

Figure 7A:
FIGS. 7A to 7D are diagrams illustrating exemplary results of the attribute determination process.
Figure 7B:
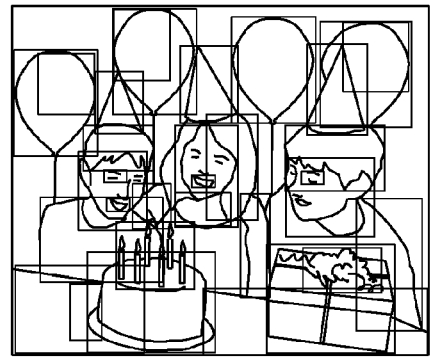

FIGS. 7A to 7D illustrate exemplary results of the process from candidate region extraction to scene class determination. FIG. 7A illustrates an example of an input image. FIG. 7B illustrates object candidate regions extracted by the candidate region extraction unit 102 using rectangular frames (for the simplification of illustration, all candidate regions are not illustrated).

Figure 7C:
Figure 7D:
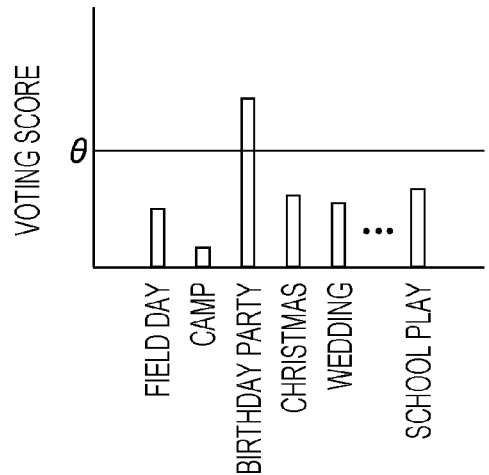

FIG. 7C illustrates a result of the elimination of a candidate region determined to be of a non-object region class by the attribute determination unit 104 from all candidate regions. FIG. 7D illustrates an exemplary result of scene class voting conducted using remaining candidate regions. In this drawing, the sign of θ represents a threshold value used to determine a scene class. In this example, a birthday party scene having a score exceeding the threshold value θ is output as a result of the scene class determination. Subsequently, the recognition process ends.

<Learning Phase>

Next, the learning of an ensemble classification tree called a learning phase will be described. The object of this processing is that (1) a learning image set provided by a user, (2) a scene class teaching value corresponding to the learning image set, and (3) an object position teaching value corresponding to the learning image set are supplied to the attribute determination unit 104 for learning and an ensemble classification tree capable of accurately determining the type of a scene class of an input image is created.

FIG. 8 illustrates the configuration of a recognition apparatus in the learning phase. This configuration is based on the basic configuration in the recognition phase illustrated in FIG. 1. The difference between them is that an object position data input unit 106 and an image attribute data input unit 107 are present in FIG. 8 and an image scene class and an object position teaching value are input.

An operation process in the learning phase will be described with reference to a flowchart illustrated in FIG. 9A.

In step S901, the image input unit 101 inputs a learning image. At the same time, the image attribute data input unit 107 inputs a scene class teaching value corresponding to each learning image.

In step S902, the object position data input unit 106 inputs the teaching value of an object region position for each learning image.

Figure 10A:
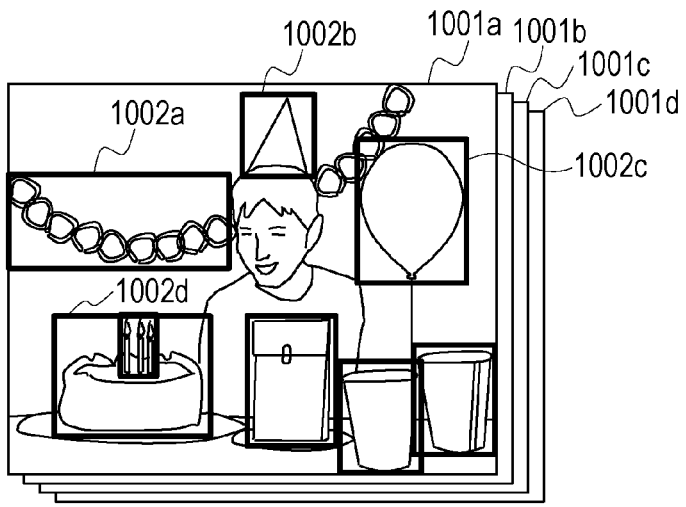
FIGS. 10A to 10C are diagrams illustrating exemplary results of extraction of a learning object region in the learning phase.

The object position data is a teaching value representing the position of an object region in an image illustrated in FIG. 10A, and is prepared by a user in advance. Referring to FIG. 10A, as exemplary teaching values representing the positions of object regions, rectangles (partly assigned with numerals of 1002a to 1002d) circumscribing object regions are illustrated.

It is difficult for a user to determine which of objects contributes significantly to the determination of a scene when the number of determination target scenes is large. Therefore, a user does not perform the estimation of each object. A user only performs the determination of whether a target is an object and teaches the positions of as many objects as possible. The teaching of a very small object and an object hidden behind something may be omitted so as not to complicate learning.

Figure 10B:
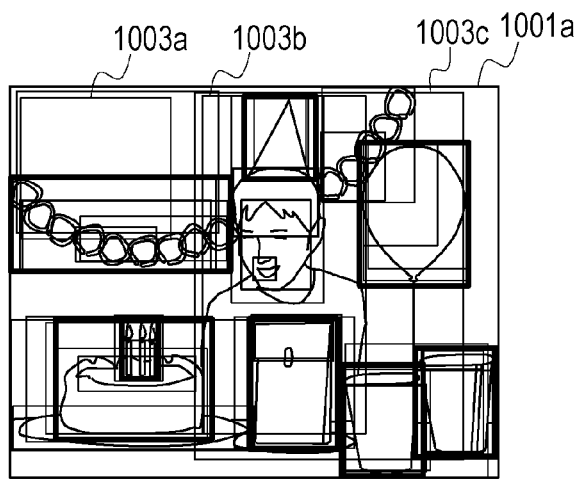

In step S903, the candidate region extraction unit 102 extracts a candidate region using the same method as performed in the recognition phase. FIG. 10B illustrates an exemplary result of extraction. Some of candidate regions are assigned with the numerals of 1003a to 1003c.

In step S904, the degree of overlap (overlap value) between the extracted candidate region and an object region at the nearest position represented by a teaching value is determined. A value of the overlap between regions X and Y is calculated using the following equation 2.

$$\text{Overlap value}(x,y) = |x \cap y| \div |x \cup y| \qquad [\text{Equation 2}]$$

wherein the symbol of ∩ represents the product set of two regions, the symbol of ∪ represents the sum set of two regions, and the symbol of |•| represents the area (the number of pixels) of a region.

Figure 10C:
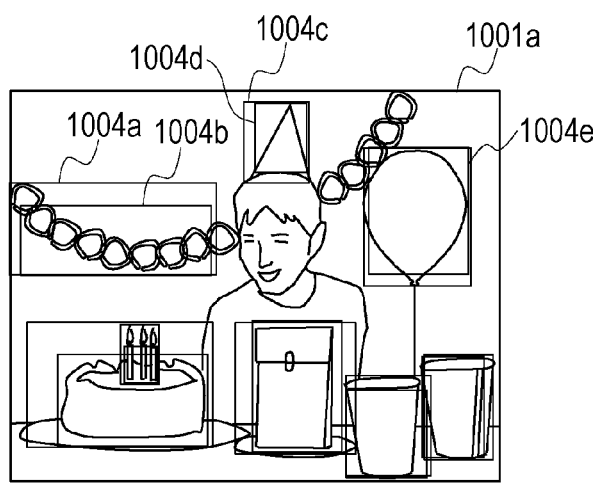

In step S905, a candidate region having an overlap value equal to or greater than a predetermined value (0.5 in this example) is used as an object region to be used for learning. Object regions employed as object regions for learning are assigned with the numerals of 1004a to 1004e in FIG. 10C.

Furthermore, a candidate region having an overlap value less than a predetermined value (0.2 in this example) is used for the next learning as a non-object class region. The number of non-object class regions is greater than that of object regions, and is therefore reduced through sampling before being used.

In step S906, using object region learning data and non-object region learning data which have been obtained in the above-described process, the learning of the attribute determination unit 104 is performed. The following process is important and will be described in detail below with reference to FIG. 11.

In step S1101 illustrated in FIG. 11, the feature value extraction unit 103 extracts feature values of all of object regions and non-object regions using the same method as performed in the recognition phase. In steps S1102 to S1106, the feature value of each region is extracted.

In step S1103, learning is started from a root node. Scene classes for which learning data is present are randomly divided into two groups. Non-object regions are also regarded as independent scene classes, and are included in randomly selected one of the two groups.

In step S1104, the learning of a discriminator is performed so that the feature values of pieces of learning data can be divided into the two previously defined groups. As a machine learning method, a popular method performed by a linear support vector machine (hereinafter referred to as an SVM) is used. At that time, part of these pieces of learning data are randomly sampled and is held in reserve as evaluation data without being used for learning.

In step S1105, using these pieces of evaluation data, the effectiveness of the determination ability of an SVM is evaluated. An SVM determines the pieces of evaluation data and divides them into two. The following information amount (Equation 3) commonly used for the learning of a classification tree is calculated.

$$E = \sum_{k \in \{L,R\}} \frac{n_k}{N} \sum_{c \in C} -p_{kc} \log p_{kc} \qquad [\text{Equation 3}]$$

In this equation, c represents a variable for a scene class, and $p_{kc}$ represents the proportion of a scene class c in k-side (pieces of divided data are represented by the symbols of L and R) data. N represents the number of pieces of data before division, and $n_k$ represents the number of pieces of data divided into a k side. When there is the unevenness of class distribution in each group of pieces of divided data, an information amount becomes large. When there is no unevenness, an information amount becomes small.

In steps S1102 to S1106, the random definition of two groups, the learning of an SVM, and the evaluation of a result of determination performed by an SVM are repeated a predetermined number of times.

After the process has been repeated a predetermined number of times, the parameter of an SVM with which the largest amount of information has been obtained is employed as a discriminator for the node in step S1107.

In step S1108, using the employed SVM learning parameter, learning data is determined again and is divided into two in accordance with a result of the determination of whether an SVM score is positive or negative. The divided pieces of data are assigned to respective nodes of right and left branches. In the right and left branches, the process from step S1102 is recursively repeated.

However, when the number of types of scene class becomes only one after division (step S1109) or the number of pieces of data is below a predetermined number after division (step S1110), the learning of the branch is stopped and a leaf node is set. Remaining pieces of learning data at that time are stored in the leaf node and recursive processing ends.

Figure 12:
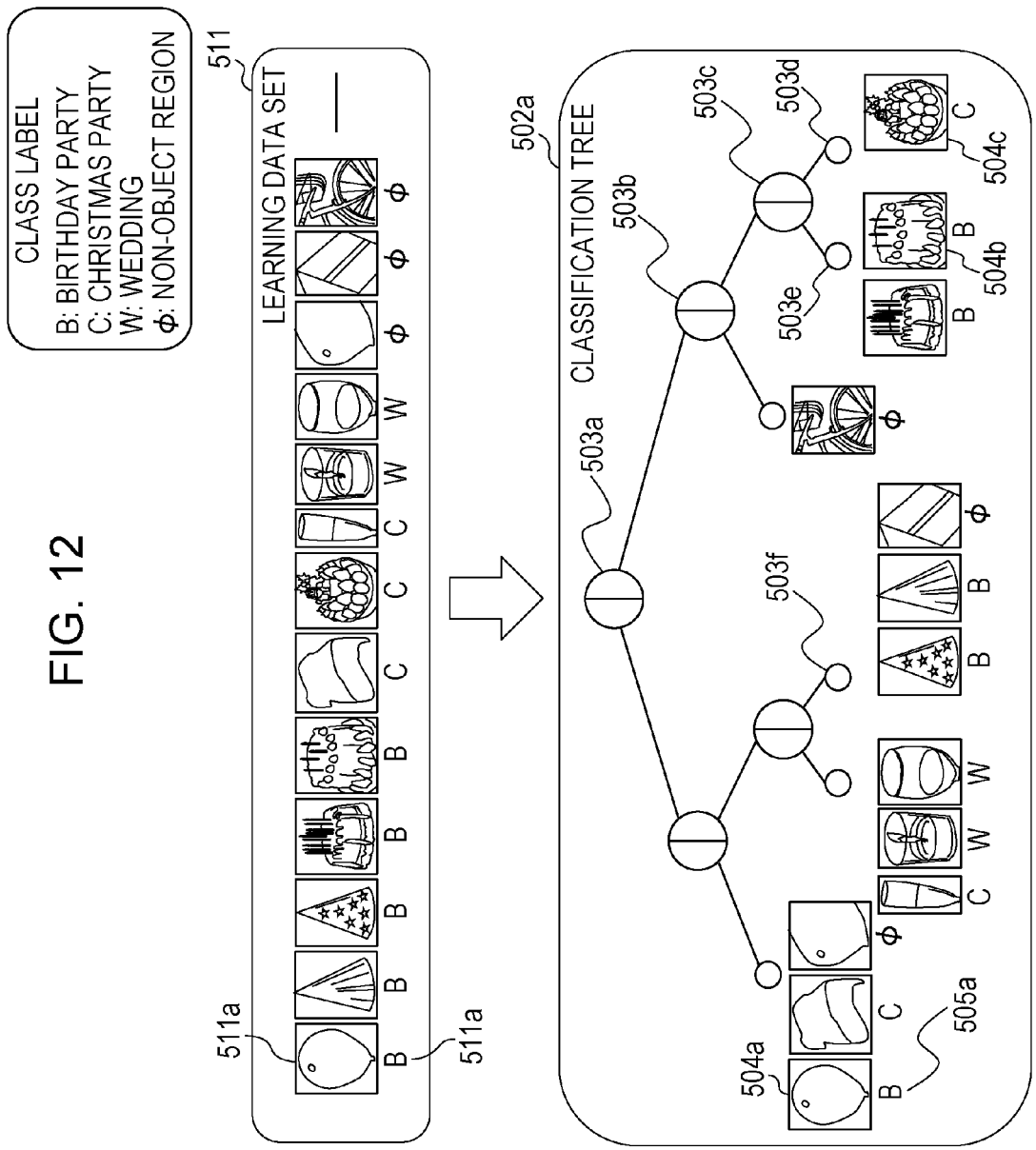
FIG. 12 is a schematic diagram illustrating a result of learning performed by the attribute determination unit.

Thus, after division at each node, determination is performed so that the occurrence frequency of scene classes is biased. As a result, the classification of scene classes is performed. FIG. 12 illustrates an exemplary result of such learning in outline.

Referring to FIG. 12, at each of leaf nodes (partly assigned with the numerals of 503d to 503f) of a classification tree 502a, pieces of data having feature values close to one another or having the same scene class are gathered. Perfect classification is not always achieved. However, by learning many such classification trees and integrating these classification trees into an ensemble classification tree through voting, an accurate result of scene class determination is obtained.

Note that the birthday cake 504b and the Christmas cake 504c are present at different leaf nodes 503e and 503d, respectively. In this method, subjects are not classified by a subject type such as cake or hat and are classified by a scene class to which a subject belongs. Therefore, since objects of the same type of cake belong to different scene classes of birthday and Christmas and differ from each other in appearance, they can be automatically classified into different branches as illustrated in FIG. 12. This is an important effect of the present invention and is strongly emphasized here.

An SVM is used for the learning of a discriminator, and an information amount criterion is used as an evaluation criterion. However, various known methods for discriminators may be employed. For example, a linear discrimination analyzer may be used instead of an SVM and the Gini coefficient may be used as an evaluation criterion.

The classification tree learning method has been described. In the above-described description, only one classification tree is learned. An ensemble classification tree includes a plurality of classification trees. Learning needs to vary from classification tree to classification tree. There are a plurality of known methods for this. In this embodiment, the most common method is used. That is, the subsampling of learning data is performed for each classification tree and learning is performed using different learning data sets in classification trees.

<Derivative of Subject Position Teaching Method>

A learning method of teaching the position of a subject as a teaching value has been described. It is not essential to teach the position of a subject at the time of learning in the present invention. In order to show that the scope of the present invention is not limited to this method, the other derivatives of a subject teaching method will be described below.

As examples of a subject teaching value supply method, the following four methods can be considered.
(1) A user teaches many positions of subjects in all images.
(2) A user teaches only a part of the positions of subjects.
(3) A user does not teach the positions of subjects.
(4) A user teaches the positions of only subjects considered to be strongly related to scene classes.

The method (1) has already been described. In the method (4), only objects such as a Christmas tree obviously related to a corresponding scene such as a Christmas party are instructed. The derivatives (2) to (4) will be briefly described in this order.

The derivative method (2) of teaching only a part of the positions of subjects will be described. Only the difference between the derivative methods (1) and (2) will be described.

The derivative method (2) is similar to a known learning method called semi-supervised learning. More specifically, first, the feature value of an object region is extracted from a learning image on which the position of an object is taught. Next, candidate regions are also extracted from a learning image having no teaching value and the feature values of the extracted candidate regions are calculated. Next, it is determined whether a region having a feature value similar to that of a taught region by a value equal to or greater than a predetermined value is included in the extracted candidate regions. When such region is included in the extracted candidate regions, the candidate region is preferentially employed as an object region for learning. A region having a feature value similar to that of a taught region by a value less than the predetermined value is employed learning data of a non-object class.

Next, the derivative method (3) of teaching no information on a subject will be described. In this derivative method (3), using all candidate regions extracted from a learning image regardless of whether each of the candidate regions is an object region or a non-object region, the learning of a classification tree is performed. The process in the learning phase is illustrated in FIG. 9B.

Steps S911, S912, and S913 in the flowchart illustrated in FIG. 9B correspond to steps S901, S903, and S906, respectively. In this method, the above-described "non-object region class" is not set. Therefore, many imperfectly extracted regions and many regions irrelevant to objects are also used for learning as subject regions related to scene classes.

With the derivative method (3), although the teaching burden on a user is reduced, the accuracy of determination becomes low. A plurality of solutions to this problem can be considered.

The first solution is to increase the number of pieces of data and the number of classification trees so as to increase the number of votes at the time of recognition. In ensemble learning, it is widely known that even though the determination accuracy of each weak identifier (classification tree) is low, a determination accuracy gradually increases with the increase in the number of a wide variety of weak identifiers.

In another solution to the subject teaching derivative method (3), after the candidate region extraction unit 102 has extracted a candidate region, the degree of accuracy of extraction of an object region (hereinafter referred to as the degree of being an object) is estimated. A region determined to have a low degree of being an object is not used for learning and recognition. There are various known methods of estimating the degree of being an object. See, for example, Joao Carreira and Cristian Sminchisescu, Constrained Parametric Min-Cuts for Automatic Object Segmentation, IEEE Conference on Computer Vision and Pattern Recognition, 2010 (Non-Patent Document 5).

Non-Patent Document 5 solves a regression problem by inputting the feature value of a candidate region and estimating an overlap value representing the amount of overlap between the candidate region and a real object region (see Non-Patent Document 5 for details).

On the basis of such a method, the process is changed as illustrated in the flowchart in FIG. 9C.

After a candidate region has been extracted in step S922, an overlap value is estimated and is set as the degree of being an object in step S923. In step S924, a region having the degree of being an object less than a predetermined value is removed. In step S925, learning and recognition are performed.

Next, the derivative method (4) of teaching only an important subject will be described. An example of the derivative method (4) is as follows. An object candidate region that overlaps an important object set by a user is weighted in accordance with the amount of overlap between them at the time of the learning of a classification tree. The other object candidate regions that do not overlap the important object are used for learning without being weighted.

The derivative method (4) will be described in detail below. Like the derivative method (3) of teaching no object position, all object candidate regions are extracted. The estimation of the degree of being an object is performed on each of the extracted object candidate regions. An object candidate region having a low degree of being an object is removed. The value of an overlap between an important object set by a user and each of the remaining object candidate regions is calculated. On the basis of the overlap value, an object candidate region x is weighted by w(x) in the following equation 4 and the learning of a classification tree is performed.

$$w(x) = \beta O(x) + 1 \quad [\text{Equation 4}]$$

In this equation, O(x) represents the degree of an overlap between the region x and an important object and β represents a coefficient equal to or greater than 0. The greater the coefficient, the greater the importance placed on the important object at the time of learning. As the value of β, an appropriate value is set by a cross-validation method or the like.

The information amount obtained from Equation 4 is expanded and is used as an information amount criterion in which the weight of importance of learning data is considered. Using this information amount criterion, Equation 3 is expanded and is defined as follows. Using this equation, the learning of a discriminator is performed.

$$E' = \sum_{k \in \{L, R\}} \frac{n_k}{N} \sum_{c \in C} -p_{kc}(w) \log p_{kc}(w) \quad [\text{Equation 5}]$$

In this equation, $p_{kc}(w)$ represents the weighted proportion of the number of pieces of learning data of a scene class c, and is represented by the following equation.

$$p_c(w) = \frac{\sum_{x \in c} w(x)}{\sum_{x \in C} w(x)} \quad [\text{Equation 6}]$$

As a result, learning can be performed so that greater importance is placed on a region near an important object. The same value as obtained from the existing equation for learning is obtained from the above-described equation when β is 0 or there is no important object in a learning case.

The exemplary derivatives (1) to (4) of a subject region teaching method in the learning phase have been described.

<Derivative Using Large Classification and Small Classification>

The derivative of an entire configuration of a recognition apparatus according to an embodiment of the present invention will be described below.

As a derivative of a method according to this embodiment, a method of broadly classifying scenes using an existing scene classification method and then determining detailed scenes using an embodiment of the present invention will be described.

In the following description, broad scene class classification is referred to as a large classification scene and detailed scene class classification is referred to as a small classification scene. For example, examples of the large classification scene include party and field sport and examples of the small classification scene include Christmas party, birthday party, soccer, and baseball.

It is known that, as a method of determining a large classification scene, the method called Bag of Words is effective as described in Svetlana Lazebnik, Cordelia Schmid, Jean Ponce, Beyond Bags of Features: Spatial Pyramid Matching for Recognizing Natural Scene Categories, IEEE Conference on Computer Vision and Pattern Recognition, 2006 (Non-Patent Document 6).

Figure 13:
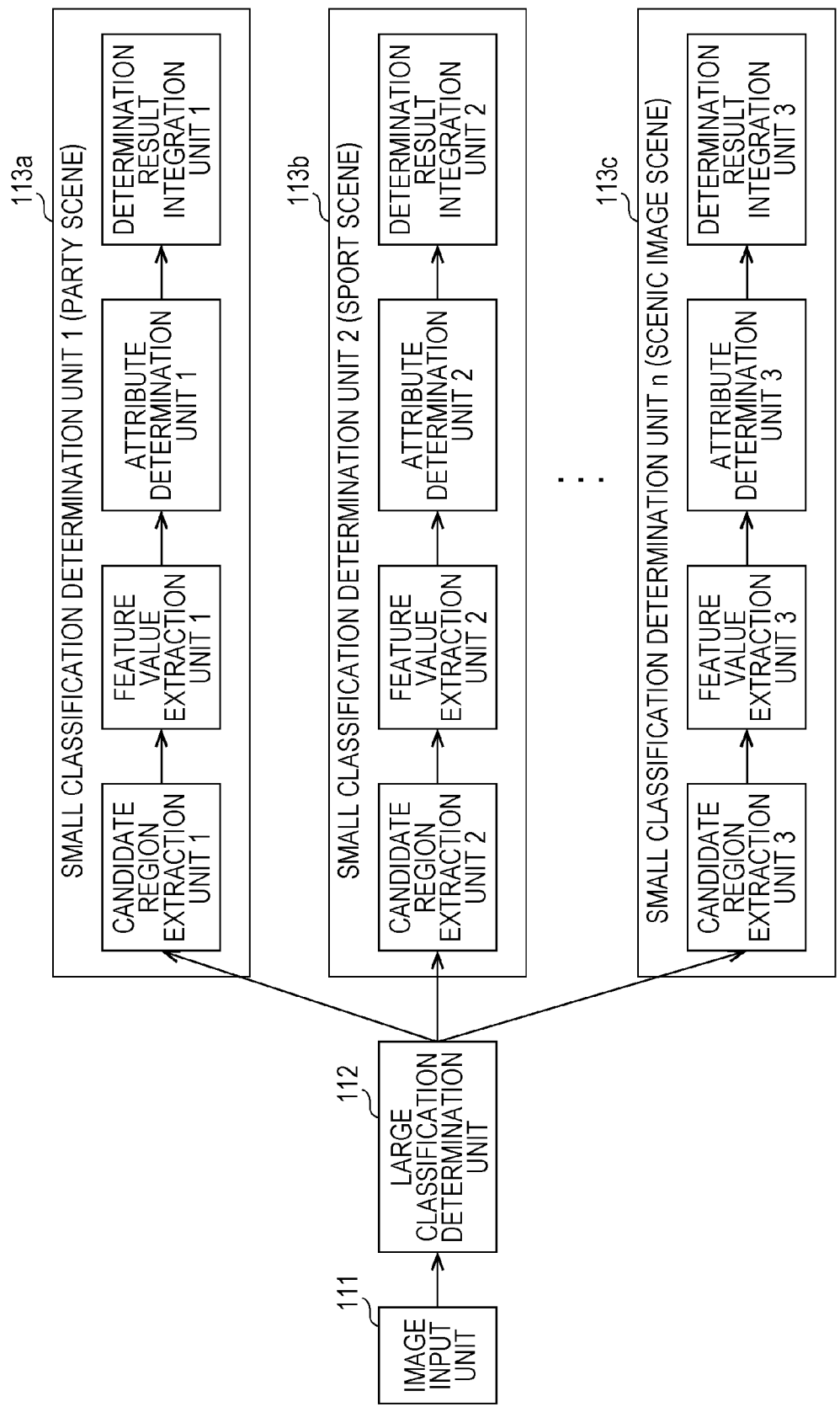
FIG. 13 is a block diagram illustrating an exemplary configuration of a derivative of the first embodiment.

FIG. 13 illustrates the configuration of a recognition apparatus.

A camera image is input into an image input unit 111. A large classification determination unit 112 classifies images into various scenes such as a party scene, a sport scene, and a scenic image scene using the Bag of Words method disclosed in Non-Patent Document 6.

One of small classification determination units 113a to 113c is selected in accordance with the determination in the large classification determination unit 112 and the following process is performed.

Attribute determination units in the small classification determination units 113a to 113c have different parameters (determination dictionaries) that have been learned using different pieces of learning data corresponding to large classification scenes.

This means that the small classification determination unit 113a for analyzing a party scene receives only party images of various types as pieces of learning data and performs learning. For a candidate region extraction unit and a feature value extraction unit, a candidate region extraction criterion and a feature value type which are suitable for the determination of a small classification scene may be set.

The suitable criterion and the suitable feature value may be manually adjusted by a user. Alternatively, a parameter with which the highest accuracy is obtained may be selected from among a set of a plurality of parameters using the cross-validation method or the like. As a result, more accurate determination of a large classification scene class is performed. The derivative of a method according to an embodiment of the present invention has been described. Thus, an embodiment of the present invention can be combined with an existing method.

The description of the first embodiment ends.

As described previously, using a recognition apparatus according to the first embodiment, it is possible to analyze an object in an image and determine a detailed scene of the image. In addition, learning for scene determination can be performed without teaching in advance a subject to be determined in each scene.

Even if the number of determination target scenes increases, a recognition processing time does not markedly increase. It is possible to discriminate between similar scenes on the basis of not only the presence or absence of a subject but also the difference in variations of a subject.

Second Embodiment

The second embodiment is an extension of the first embodiment. Only the difference between the first and second embodiments will be described.

In the first embodiment, object regions serve as clues to the estimation of a scene class of an image. By classifying the object regions, the scene class of an image is estimated. In an image scene including no object, for example, an image scene including only a landscape such as a sea or a mountain, there is no determination clue.

In the second embodiment, the region of a subject other than an object is employed as an analysis target. Various types of candidate regions are extracted and it is determined which of scene classes the extracted candidate regions belong to using different attribute discriminators. By multilaterally analyzing a scene class using a plurality of types of subjects, the determination of a scene class is expected to be more robustly performed as compared with a case in which only object regions are used as clues.

Figure 14:
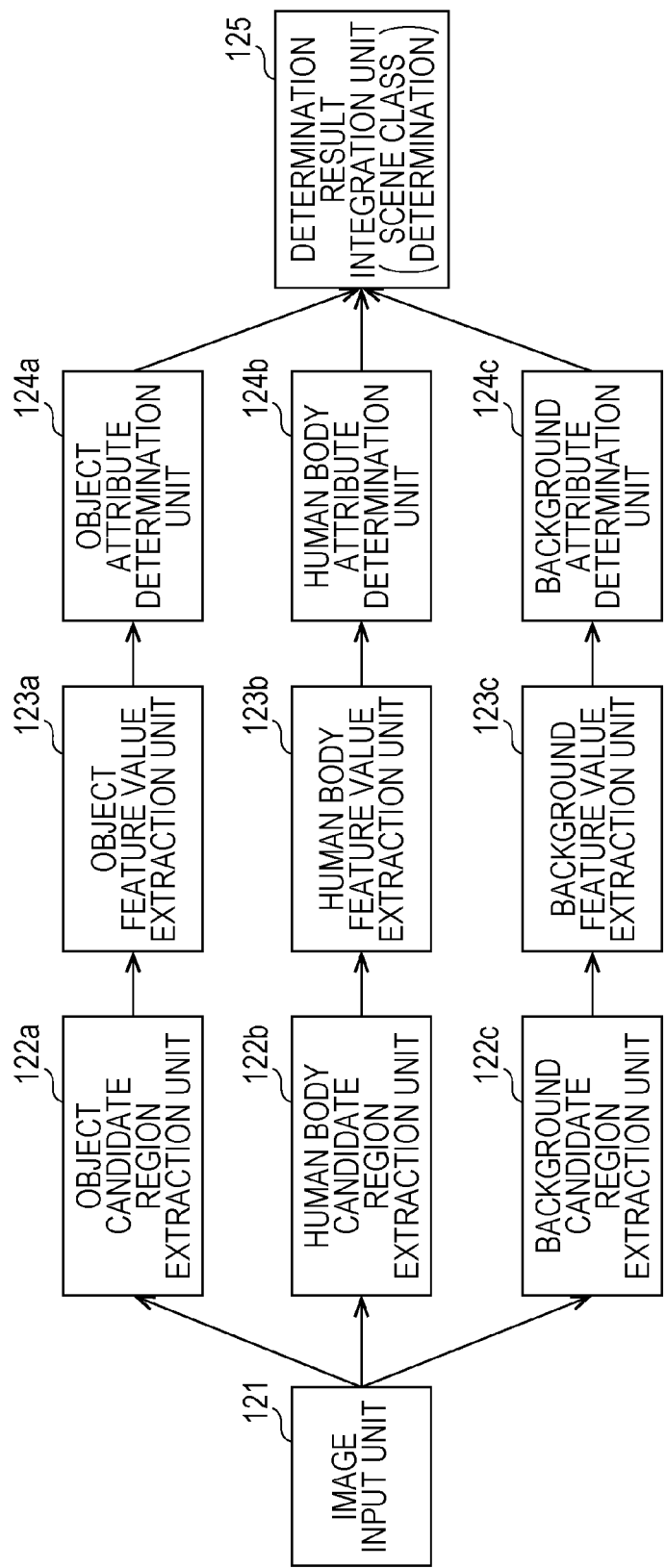
FIG. 14 is a block diagram illustrating the basic configuration of a recognition apparatus according to a second embodiment.

FIG. 14 illustrates the basic configuration of a recognition apparatus according to the second embodiment. The basic configuration according to the second embodiment differs from the basic configuration according to the second embodiment in that three different types of subject candidate region extraction units, and three different types of feature value extraction units, and three different types of attribute determination units are provided. More specifically, this recognition apparatus includes an object candidate region extraction unit 122a for extracting an object candidate region, a human body candidate region extraction unit 122b for extracting the region of a human body, and a background candidate region extraction unit 122c for extracting the region of a background such as the sky, a mountain, and a floor.

Like in the first embodiment, the object candidate region extraction unit 122a extracts an object candidate region. The human body candidate region extraction unit 122b extracts a human body candidate region using a known method disclosed in P. Felzenszwalb, D. McAllester, D. Ramanan, A Discriminatively Trained, Multiscale, Deformable Part Model, IEEE Conference on Computer Vision and Pattern Recognition, 2008 (Non-Patent Document 7). The background candidate region extraction unit 122c extracts a region having a large area and high uniformity of color or texture as a background region. More specifically, an image is divided into a plurality of regions using the texture analysis method disclosed in Non-Patent Document 4 and the divided regions are extracted as background candidate regions.

The feature value extraction units 123a to 123c extract feature values corresponding to subject types. The object feature value extraction unit 123a and the background feature value extraction unit 123c extract the same feature values described in the first embodiment. The human body feature value extraction unit 123b divides a detected human body region into three parts, a head, an upper body, and a lower body, so as to intensively determine the presence or absence of clothes and headwear, extracts a color SIFT feature value from each of the parts, and couples these color SIFT feature values so as to generate a feature vector.

The attribute determination units 124a to 124c perform the learning of different types of subjects. A learning method is similar to that according to the first embodiment. Some variations of the learning method are made.

When a background region is, for example, a uniform blue sky region, it can be determined that the scene of an image is an outdoor scene. However, it is impossible to determine whether the scene of the image is a camp scene or a baseball scene. When the learning of the background attribute determination unit 124c is performed using the method according to the first embodiment, over-learning may occur.

The following solutions are therefore created. One solution is that learning is promptly terminated so as to prevent the occurrence of over-learning when the depth of a classification tree is equal to or greater than a predetermined value. Another solution is that an information amount criterion is not used at the time of the learning of a discriminator at each node and a simple discriminator for randomly dividing data is employed.

This simple discriminator is provided by setting the coefficient of a discriminant function for a discriminator in each classification tree to a random value. This discriminator performs a method that is mathematically the same as known machine learning methods called the Hash method, the random projection, the similar case data search, and the approximate nearest neighbor searching. That is, not only an ensemble classification tree but also the above-described various machine learning methods can be applied to a discriminator in an attribute determination unit according to an embodiment of the present invention.

Subsequently, the determination result integration unit 125 integrates results of voting performed by the attribute determination units 124a to 124c. At that time, since the reliability of a determination result varies from subject type to subject type, determination results are not added. A weight of $W=[w_1, w_2, w_3]^T$ is defined and the weighted sum of the determination results is calculated. On the basis of the weighted sum, the attribute of an image is identified and the identified image attribute serves as a final determination result. Here, W may be determined from a plurality of candidate values using the cross-validation method or may be obtained by determining a value with which the highest determination accuracy can be achieved on average using the least squares method. Instead of the weighted sum, learning may be performed using a discriminator such as a support vector machine for receiving the above-described voting results and outputting the attribute of an image.

The description of the second embodiment in which the determination of a scene class is performed using a plurality of types of subjects ends.

Third Embodiment

A recognition apparatus according to the third embodiment determines the scene class of a moving image. In this embodiment, a method of determining the normal state or abnormal state of a surveillance camera image will be described. There are a plurality of types of abnormal states of a surveillance camera image. In this embodiment, a recognition apparatus for determining the abnormal behavior of a crowd will be described.

Figure 15:
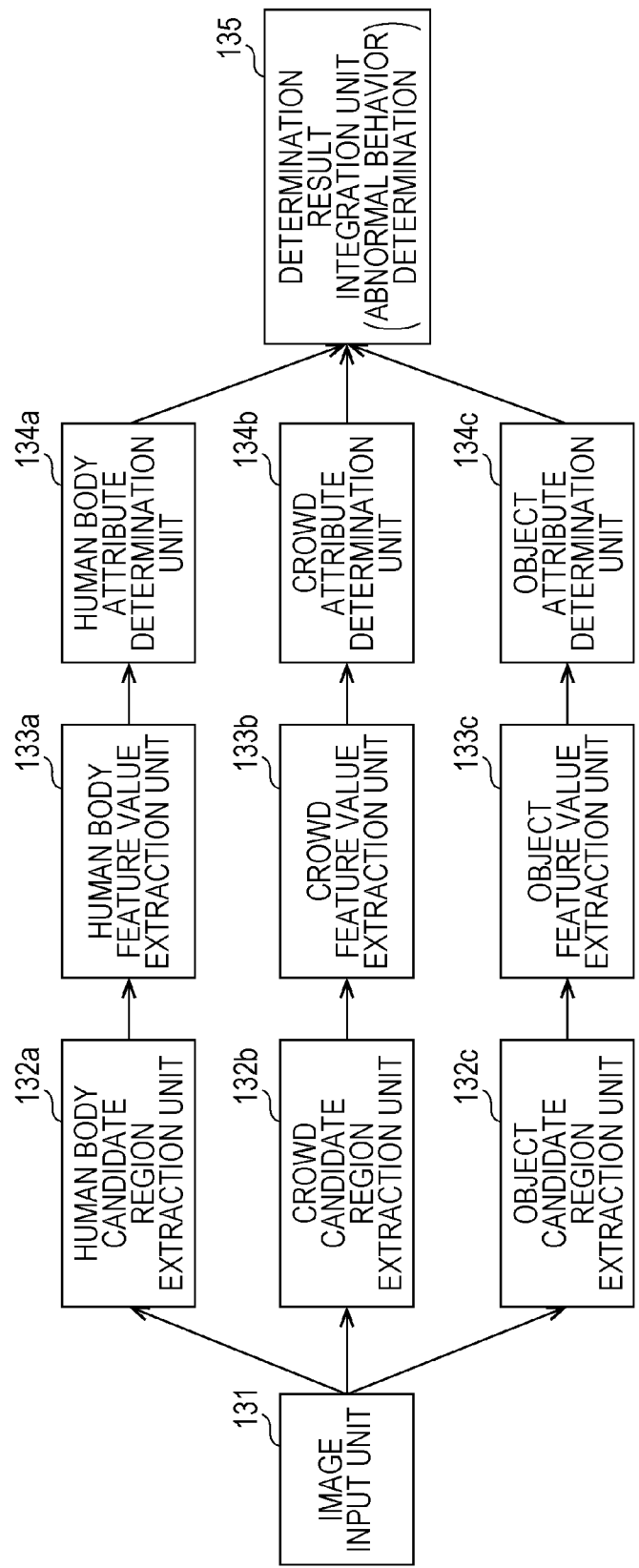
FIG. 15 is a block diagram illustrating the basic configuration of a recognition apparatus according to a third embodiment.

FIG. 15 illustrates the basic configuration of a recognition apparatus according to the third embodiment.

A moving image captured by a surveillance camera is input into an image input unit 131. Like in the second embodiment, a human body candidate region extraction unit 132a detects a human body using, for example, the human body detection method disclosed in Non-Patent Document 7. A human body feature value extraction unit 133a calculates the appearance feature value of a human body candidate region.

In addition, the human body feature value extraction unit 133a refers to a preceding moving image frame and a succeeding moving image frame so as to extract the movement direction, movement speed, and motion feature vector of the extracted human body and adds them to the feature value. Like in the first embodiment, the appearance feature value is the histogram of color SIFT features. The motion feature vector is extracted using the known method called cubic higher-order local auto-correlation (CHLAC) disclosed in, for example, T. Kobayashi and N. Otsu. Action and Simultaneous Multiple-Person Identification Using Cubic Higher-Order Local Auto-Correlation", In Proc. International Conference on Pattern Recognition, pp. 741-744, 2004 (Non-Patent Document 8).

Subsequently, a human body attribute determination unit 134a causes a discriminator including an ensemble classification tree to determine the feature value of the human body region so as to obtain from each human body candidate region a likelihood score representing the scene (abnormal scene or normal scene) of the human body like in the first embodiment. Like in the first embodiment, a human body attribute determination unit 134a has already learned, using a classification tree, feature values of human bodies which the human body candidate region extraction unit 132a has extracted from the learning data of an abnormal-scene moving image and the learning data of a normal-scene moving image. As a result, it can be determined that a region of a human body showing an abnormal behavior, for example, a weapon-wielding person, an escaped person, or a person fighting, has a high degree of abnormality.

Figure 16A:
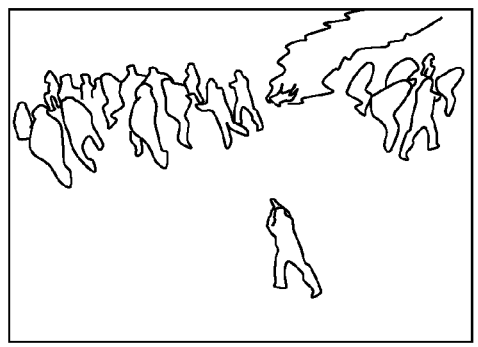
FIGS. 16A to 16D are diagrams illustrating exemplary results of extraction of a subject candidate region according to the third embodiment.
Figure 16B:
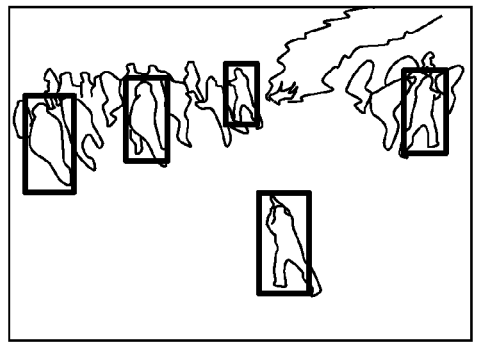

Using the human body detection method disclosed in Non-Patent Document 7, a standing human body can be accurately detected. However, it is difficult to detect a person whose head is partly observed in a crowd, a person having a small appearance size, and a person in a posture other than standing. FIG. 16A illustrates an exemplary scene of a crowd moving image. As illustrated in FIG. 16B using black rectangular frames, only a small number of human bodies are detected under this condition.

In order to solve this problem, this recognition apparatus extracts crowds in addition to human bodies, that is, causes a crowd candidate region extraction unit 132b to extract a candidate region in which a crowd probably presents. By using the feature value of the extracted candidate region as a clue, it is determined whether the candidate region is a normal-scene crowd or an abnormal-scene crowd.

For the extraction of a crowd candidate region, the CHLAC feature (see Non-Patent Document 8 for details) that has been used as a motion feature vector in the above-described case is used. The following process is performed using the CHLAC feature.

First, various crowd moving images and various moving images including no crowd are prepared in advance. Each of these moving images is divided into space-time blocks having a predetermined size of 16 pixels×16 pixels×16 frames. The CHLAC feature vector is extracted from each of these blocks.

A CHLAC feature is a 251-dimensional feature value. In 251-dimensional space, distributions of two groups of a number of samples equal to the number of blocks are obtained. Subsequently, the linear discriminant analysis, which is a common discrimination method, is performed on the two groups of data, and a projection vector onto the best one-dimensional basis with which the two groups of data is divided is obtained.

Next, the operation of the crowd candidate region extraction unit 132b at the time of recognition will be described. Upon receiving a moving image, the crowd candidate region extraction unit 132b divides the moving image into blocks of the same size as at the time of learning (blocks may overlap one another). The crowd candidate region extraction unit 132b extracts a CHLAC feature from each of the blocks, projects the CHLAC feature onto the one-dimensional basis that has been obtained through the linear discriminant analysis, and obtains a value on the basis.

Figure 16C:
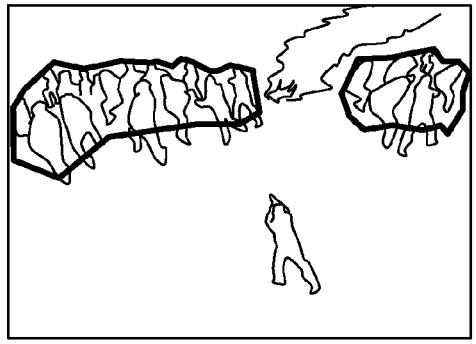

The value on the basis is the crowd likelihood of the block. The values of the blocks are subjected to threshold processing using a predetermined threshold value and a result of the processing is extracted as a crowd candidate region. FIG. 16C illustrates an exemplary result using black bold frames. Subsequently, like in the above-described embodiments, a crowd feature value extraction unit 133b extracts an appearance feature and a motion feature and a crowd attribute determination unit 134b performs the determination of an abnormal scene or a normal scene and obtains a determination score.

An extraction target region of the object candidate region extraction unit 132c is the region of an unspecified subject that is sometimes observed at the time of an abnormal behavior of a crowd. Examples of the unspecified subject include smoke from a smoke candle, flames generated when an object on a road is burned, and debris scattered by a vandal.

One feature of a recognition apparatus according to an embodiment of the present invention is that the recognition apparatus performs learning without knowing in advance which specific subject is related to the determination of a scene class at the time of learning. Therefore, the object candidate region extraction unit 132c is configured so that various object candidate regions can be extracted. More specifically, regions having similar motion features and similar appearance features are unified and the unified region is extracted as an object candidate region.

Figure 3:
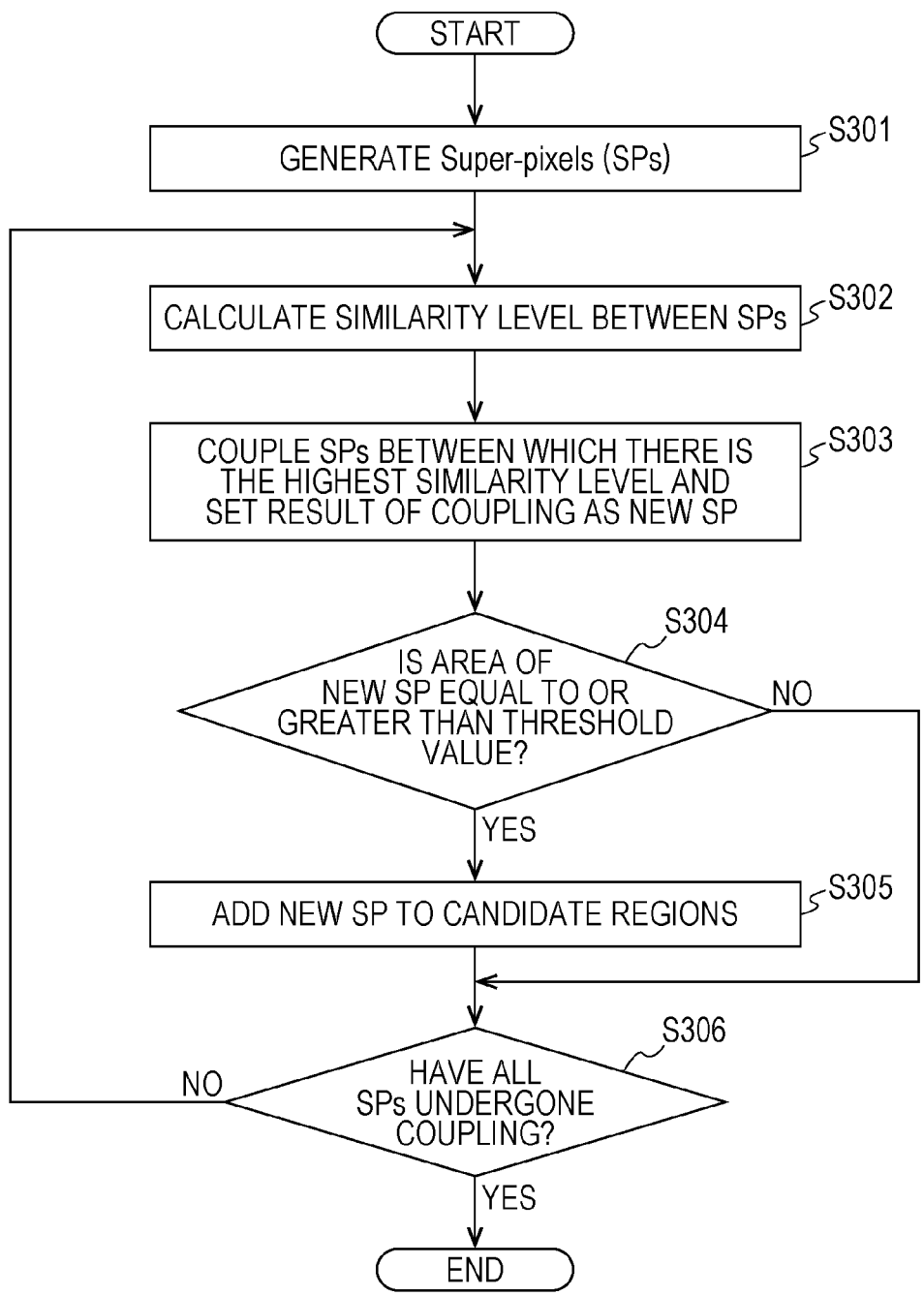
FIG. 3 is a flowchart describing a candidate region extraction process.

A method of extracting an object candidate region is an expansion of the method according to the first embodiment which has been described with reference to FIG. 3 and uses Super-pixels (hereinafter referred to as SPs). There are two different points between this method and the method illustrated in FIG. 3. The first different point is that not only the appearance feature of a pixel but also the motion feature of the pixel is used as a similarity level at the time of the coupling between SPs. The second different point is that a motionless SP region is removed from candidate regions in advance. The detailed description will be made.

First, the optical flow, which is a common moving image analysis method, is calculated for each pixel in one frame. Subsequently, an SP is created. At that time, an SP having an average of optical flows in a region which is equal to or less than a predetermined value is deleted.

Subsequently, like in steps S302 to S306 in FIG. 3, adjacent SPs are coupled. At that time, the similarity level between vectors of the SPs is calculated. The vector is obtained by coupling the RGB color distribution of an SP and the orientation distribution of optical flows of the SP. As a result, regions having similar motions and similar appearances can be unified and the unified region can be extracted as an object candidate region.

Figure 16D:
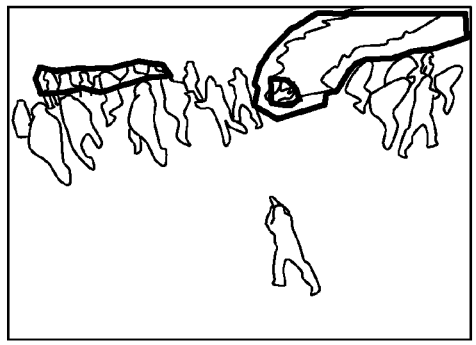

FIG. 16D illustrates a result of the operation of the object candidate region extraction unit 132c using black bold frames. Here, a region including flames and smoke and a part of a crowd are extracted object candidate regions.

The method of extracting an object candidate region is not limited to the above-described method. Any method capable of unifying regions having similar motions and similar appearances and extracting the unified region can be employed.

The operations of an object feature value extraction unit 133c and an object attribute determination unit 134c are the same as those performed on a crowd region, and the description thereof will be omitted so as to avoid repeated explanation.

Thus, a score representing whether the scene of an input moving image is a normal crowd scene is obtained from each of a plurality of types of candidate regions.

Subsequently, like in the second embodiment, a determination result integration unit 135 votes determination scores, counts votes for each subject type, and performs the weighted sum of the obtained scores. Since a result obtained from each frame may be unstable, results obtained from a plurality of frames, a preceding frame, the frame, and a succeeding frame, are subjected to moving average and a result of the moving average is set as a final result.

As a motion vector feature, not only the CHLAC feature but also various features such as a feature obtained using a time space gradient histogram and a feature obtained using Hidden Markov Model can be used. One of them may be selected in accordance with a subject type.

At the time of learning of each attribute determination unit, the determination of two scene classes is learned by supplying, for example, fire moving image data and normal scene moving image data to the attribute determination unit as learning data. As a result, a recognition apparatus having a fire detection function can be achieved. Alternatively, the determination of three scene classes such as fire, abnormal behavior, and normal can be learned by supplying teaching values of the three classes to the attribute determination unit. Thus, an embodiment of the present invention can be used so as to solve various difficulties.

Although a moving image is used in this embodiment, a distance image may be used in conjunction with a moving image so as to increase the accuracy of a surveillance camera. In this case, feature values are extracted from a luminance image and a distance image and coupled and a discriminator performs determination using these feature values.

The description of the third embodiment in which the abnormal states of a crowd and a scene are determined from a moving image ends.

Fourth Embodiment

In the four embodiment, a composition class of an input still image is determined. In addition to the determination of an image composition class, the estimation of a main subject region in an image is performed. According to the fourth embodiment of the present invention, not only the determination of information on a single variable such as a scene class but also the estimation of a complex image attribute such as a main subject region can be performed.

There are various types of image composition classes. The types of "a rising-sun composition", "a three-division composition (similar to a golden ratio)", "a diagonal composition", and "a triangle composition" are commonly known.

If a photographic composition can be automatically estimated at the time of image capturing, it is possible to set camera parameters such as a focal point and an exposure to values suitable for the composition. If a frame representing a photographic composition suitable for a subject is shown for a user, the user can easily correct the composition.

If the region of a main subject can be extracted, a focal point and an exposure can be appropriately adjusted for the main subject. For the secondary use of images, for example, the organization of images or the creation of highlights, information on a main subject is very important information.

There are some difficulties in a main subject recognition method in the related art. For example, when a method of recognizing a main subject on the basis of saliency such as the difference in color contrast is used, an unimportant region having a high contrast of color or brightness relative to the surrounding region is sometimes erroneously recognized.

For example, in a case where only the corner of a room is exposed to light in an indoor image or the white sky is slightly viewed from between houses on a road, a high-contrast part is sometimes erroneously recognized as a main subject.

For example, there is another method of determining a main subject using an object detection method such as a human body detection method or a face detection method. It is difficult to detect various unspecified objects with such a method using an object detection method.

In this embodiment, subjects included in an image are extracted and are then classified and determined by an attribute determination unit. Composition classes and main subject regions are estimated for respective subjects and are then integrated. As a result, these image attributes can be automatically determined.

Figure 18A:
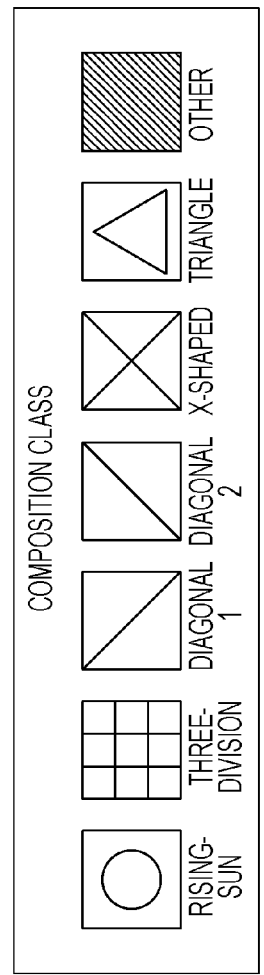
FIG. 18A is a diagram illustrating composition classes.

FIG. 18A illustrates seven types of image composition classes that are determination targets in this embodiment. A teaching value representing which of the seven classes an image belongs to is assigned to each image serving as learning data in advance. In addition, a main subject teaching value is assigned to a main subject region in each image using a binary image.

Figure 17:
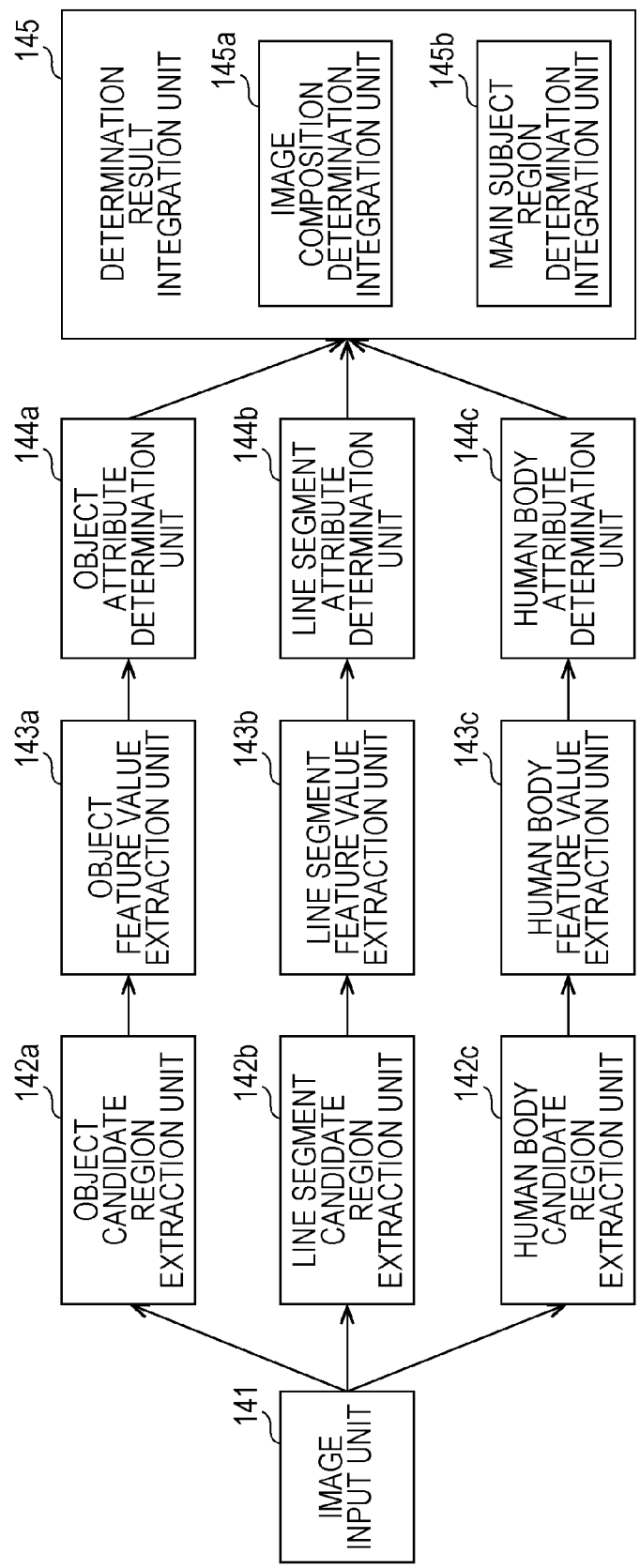
FIG. 17 is a block diagram illustrating the basic configuration of a recognition apparatus according to a fourth embodiment.

FIG. 17 illustrates the basic configuration of a recognition apparatus according to the fourth embodiment which is based on the basic configuration of a recognition apparatus according to the second embodiment. This configuration differs from that according to the second embodiment in that a determination result integration unit 145 includes two functional parts, an image composition determination integration unit 145a and a main subject region determination integration unit 145b.

The difference between the fourth and second embodiments will be mainly described.

Three types of subjects, object, line segment, and human body, are extracted as candidate regions in this embodiment. The large difference between them is that information on a line segment considered to be effective in estimating a composition is added.

In order to extract a line segment candidate region, processing for extracting line segments from an input image by Hough transform and leaving only a line segment having an edge strength and a length equal to or greater than corresponding predetermined values is performed.

Figure 18B:
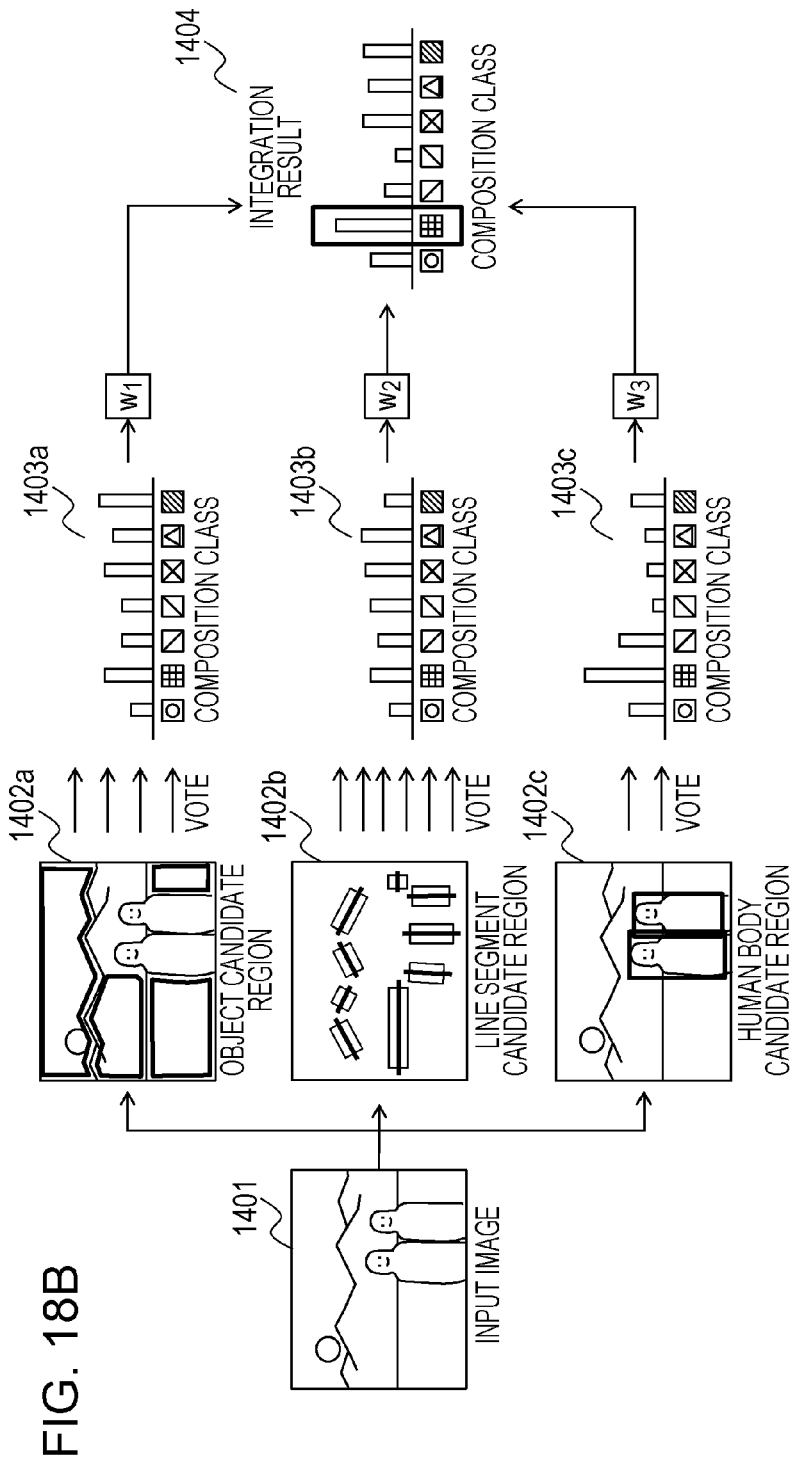
FIG. 18B is a diagram illustrating exemplary results of estimation.

FIG. 18B illustrates an exemplary result of extraction of a line segment candidate region assigned with a numeral of 1402b. A line segment feature value extraction unit 143b extracts a color SIFT feature from a predetermined surrounding region of a candidate line segment and sets the color SIFT feature as the appearance feature value of the candidate line segment. In addition, the barycentric position, length, and slope of the candidate line segment are calculated and coupled and a result of the coupling is set as a feature value.

The feature values of an object candidate region and a human body candidate region are extracted using a method similar to that according to the second embodiment. In addition to these feature values used in the second embodiment, the feature value of the barycentric position and the feature value of the second moment of a region shape, which are considered to be important in determining a composition, are extracted from each region. A high-contrast region and a focused region have a significant impact on the determination of a composition. Therefore, the difference in color contrast between the inside and the outside of each region and the ratio between the edge amounts of the inside and the outside of each region, which are related to contrast and focusing, are also extracted as feature values.

In subject attribute determination units 144a to 144c, the feature value of a subject and the composition class of an image including the subject are associated with each other and an ensemble classification tree is learned in advance. This is the same as the fact that the feature value and scene class of each subject candidate region are associated with each other and learning and determination are performed in the second embodiment. By integrating pieces of information serving as clues to the determination of a composition class, for example, the feature values (position, size, and edge strength) of each subject, a composition class can also be accurately determined as in the case of determining a scene class.

FIG. 18B illustrates exemplary results of composition class estimation performed using such an ensemble classification tree. The estimation of a composition class is performed for extracted subject regions 1402a to 1402c and voting is performed. Results of the voting are represented in voting spaces 1403a to 1403c. The weighted sum of the results is performed for integration, and a final result 1404 is obtained. Referring to the drawing, the three-division composition is output as the final result.

Next, a method of estimating a main subject region will be described. In order to estimate a main subject region and a composition class at the same time, the following processing is performed when the learning of a composition class is performed using an ensemble classification tree. That is, not only the proportion of a composition class in learning data but also information on a main subject region in learning data is stored in a leaf node of each discriminator. Such data other than a target learning variable is called metadata.

Information on a main subject region that is metadata is normalized to an image having the aspect ratio of 1:1. At a leaf node, main subject region images are averaged and a resultant is set as the prior distribution of a main subject at the leaf node. The resultant is approximated by a Gaussian distribution and only a Gaussian distribution parameter is stored. The reason why a prior distribution itself is not used and approximation is performed is that the increase in the size of a classification tree results in the increase in a storage capacity and a voting computation speed. If these problems do not occur, approximation does not have to be performed and a prior distribution itself may be stored. Approximation may be performed by a mixture Gaussian distribution.

FIG. 19A illustrates an example of acquired metadata of a main subject region. A numeral of 1412 represents a prior distribution (a resultant of approximation of the prior distribution by a Gaussian distribution) of a main subject region stored in a leaf node that a sky region 1411 extracted as an object candidate region has reached when being determined by a classification tree.

In the case of an image including a uniform region such as the sky region 1411 in its upper part, a main subject region is probably not present in the upper part. This exemplary result therefore indicates that a main subject region is probably present somewhere around the center of an image as illustrated in FIG. 19A.

FIG. 19B illustrates exemplary results of voting performed with metadata of the prior distribution of a main subject region corresponding to each candidate subject. Exemplary results of voting corresponding to subjects are assigned with the numerals of 1413a to 1413c, and a final estimation result obtained after the weighted sum of the voting results is assigned with the numeral of 1414. As is apparent from the drawing, the neighborhood of the position of a main subject (person) is estimated with a certain level of accuracy.

The description of the fourth embodiment in which the composition class and main subject region of an image are estimated ends. According to the fourth embodiment, the estimation of a composition can be performed by using a subject pattern in an image as a clue. By using metadata along with a subject classification result, the estimation of a main subject region can be performed through a learning process. This is very different from a known method of performing determination using a mechanical criterion such as saliency.

According to an embodiment of the present invention, the determination of various attributes of an image, for example, the determination of a composition of the image, the determination of a normal or abnormal behavior of a crowd in the image, and the determination of a main subject in the image, can be performed by using subjects in the image as clues.

According to an embodiment of the present invention, the scene of an image can be determined on the basis of various subjects included in the image with a low processing load. In addition, it is unnecessary to teach which subject should be identified in each scene in advance.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083781, filed Apr. 15, 2014, which is hereby incorporated by reference herein in its entirety.

What is claimed is:

1. A recognition apparatus comprising:
one or more non-transitory computer-readable storage devices; and
one or more computer processing devices connected to the one or more non-transitory computer-readable storage devices and configured by one or more programs stored in the one or more non-transitory computer-readable storage devices at least to:
extract object candidate regions from an image;
extract a first feature value and a second feature value from each of the extracted object candidate regions, the first feature value being a value used for determining an attribute of the image, the second feature value being a value different from the first feature value and used for determining whether the object candidate region is a region showing an object included in the image or not;
determine the attribute of the image for each of the extracted object candidate regions on a basis of the first feature value, and determine whether the extracted object candidate region is a region showing the object or not each on a basis of the second feature value; and
identify the attribute of the image by integrating determination results regarding the attribute of the image in, among the object candidate regions, object candidate regions determined each as a region showing the object.

2. The recognition apparatus according to claim 1, wherein the extraction of the object candidate regions is performed on a basis of one of criteria.

3. The recognition apparatus according to claim 2, wherein each of the criteria has been decided in accordance with the attribute of the image to be determined.

4. The recognition apparatus according to claim 1, further configured to extract a human body candidate region from the image.

5. The recognition apparatus according to claim 1, wherein, when the attribute of the image for each of the extracted object candidate regions is learned, object candidate regions are classified in accordance with an attribute of the image.

6. The recognition apparatus according to claim 5, wherein, when classifying object candidate regions, performing learning so that a region taught as an important object candidate region is preferentially classified.

7. The recognition apparatus according to claim 1, further configured to perform learning using an object candidate region irrelevant to the attribute of the image.

8. The recognition apparatus according to claim 1, further configured to employ a method based on a classification tree.

9. The recognition apparatus according to claim 1, further configured to employ a method based on a similar case data search.

10. The recognition apparatus according to claim 1, further configured to employ a method based on a Hash method.

11. The recognition apparatus according to claim 1, wherein the determined attribute is one of an image scene, a behavior of a crowd in an image, a type of an image composition, information on a main subject in an image, and information on a direction of a light source of an image.

12. The recognition apparatus according to claim 1, wherein an image whose attribute is a determination target is a moving image.

13. The recognition apparatus according to claim 1, wherein an image whose attribute is a determination target is a distance image.

14. A recognition method comprising the steps of:
extracting object candidate regions from an image;
extracting a first feature value and a second feature value from each of the extracted object candidate regions, the first feature value being a value used for determining an attribute of the image, the second feature value being a value different from the first feature value and used for determining whether the object candidate region is a region showing an object included in the image or not;
determining the attribute of the image for each of the extracted object candidate regions on a basis of the first feature value, and determine whether the extracted object candidate region is a region showing the object or not each on a basis of the second feature value; and
identifying the attribute of the image by integrating determination results regarding the attribute of the image in, among the object candidate regions, object candidate regions determined each as a region showing the object.

15. A non-transitory computer readable storage medium storing a program for causing a computer to execute:
extracting object candidate regions from an image;
extracting a first feature value and a second feature value from each of the extracted object candidate regions, the first feature value being a value used for determining an attribute of the image, the second feature value being a value different from the first feature value and used for determining whether the object candidate region is a region showing an object included in the image or not;
determining the attribute of the image for each of the extracted object candidate regions on a basis of the first feature value, and determine whether the extracted object candidate region is a region showing the object or not each on a basis of the second feature value; and
identifying the attribute of the image by integrating determination results regarding the attribute of the image in, among the object candidate regions, object candidate regions determined each as a region showing the object.

16. The recognition apparatus according to claim 1, wherein the subject object candidate regions are extracted by repeating processing of coupling two super pixels that are adjacent to each other and have a highest level of similarity therebetween, among plural super pixels generated by dividing the image.

17. The recognition apparatus according to claim 16, wherein super pixels whose area size is greater than a predetermined value are extracted as the object candidate regions.

* * * * *